US012739437B2

(12) United States Patent
Chudik et al.

(10) Patent No.: US 12,739,437 B2
(45) Date of Patent: Sep. 15, 2026

(54) METHOD AND SYSTEM FOR PROCESSING AN IMAGE

(71) Applicant: YAMZZ IP, Roosendaal (NL)

(72) Inventors: Martin Chudik, Acton, MA (US); Yorick Bruyn, Ermelo (NL)

(73) Assignee: YAMZZ IP, Roosendaal (NL)

( * ) Notice: Subject to any disclaimer, the term of this patent is extended or adjusted under 35 U.S.C. 154(b) by 30 days.

(21) Appl. No.: 18/561,423

(22) PCT Filed: May 19, 2022

(86) PCT No.: PCT/EP2022/063611
§ 371 (c)(1),
(2) Date: Nov. 16, 2023

(87) PCT Pub. No.: WO2022/243452
PCT Pub. Date: Nov. 24, 2022

(65) Prior Publication Data
US 2024/0251104 A1 Jul. 25, 2024

(51) Int. Cl.
*H04N 19/63* (2014.01)
*H04N 19/12* (2014.01)
(Continued)

(52) U.S. Cl.
CPC ............ *H04N 19/63* (2014.11); *H04N 19/12* (2014.11); *H04N 19/182* (2014.11);
(Continued)

(58) Field of Classification Search
CPC ...... H04N 19/63; H04N 19/12; H04N 19/182; H04N 19/184; H04N 19/85; H04N 19/423
See application file for complete search history.

(56) References Cited

U.S. PATENT DOCUMENTS 5,883,978 A 3/1999 Ono
2005/0002574 A1* 1/2005 Fukuhara ............ H04N 19/647 375/E7.048
(Continued)

OTHER PUBLICATIONS

Subramanya S R et al: "Performance evaluation of hybrid coding of images using wavelet transform and predictive coding", Computational Intelligence and Multimedia Applications, 2001. ICCIMA 2001. Proceedings. Fourth International Conference on Yokusika City, Japan Oct. 30-Nov. 1, 2001, Los Alamitos, CA, USA, IEEE, US, Oct. 30, 2001 (Oct. 30, 2001), pp. 426-431.
(Continued)

*Primary Examiner* — Tracy Y. Li
(74) *Attorney, Agent, or Firm* — FisherBroyles, LLP; Roger L. Browdy; Ronni S. Jillions

(57) ABSTRACT

The invention provides an image pre-processing method. In level 1, the method comprises transforming the image (100) in a low frequency and at least one high frequency subband (111, 112, 113, 114). In level n, with n from 2 to N, and N at least 2, the method comprises: transforming the level n−1 low frequency subband (111; 121) in a level n low frequency and at least one high frequency subband (121, 122, 123, 124; 131, 132, 133, 134); resizing the level n at least one high frequency subband (122, 123, 124; 132, 133, 134) to the corresponding level n−1 at least one high frequency subband (112, 113, 114; 122, 123, 124) size; subtracting the resized level n at least one high frequency subband (122') from the corresponding level n−1 at least one high frequency subband (112, 113, 114; 122, 123, 124) to obtain level n−1 at least one subtracted subband (212, 213, 214; 222, 223, 224); and storing the level n−1 at least one subtracted subband (212, 213, 214; 222, 223, 224) in a pre-processed image (300). In level N, the method comprises storing the level N−1 low frequency subband (121) in the pre-processed image (300).

13 Claims, 19 Drawing Sheets

(51) Int. Cl.
*H04N 19/182* (2014.01)
*H04N 19/184* (2014.01)
*H04N 19/423* (2014.01)
*H04N 19/85* (2014.01)

(52) U.S. Cl.
CPC .......... *H04N 19/184* (2014.11); *H04N 19/85* (2014.11); *H04N 19/423* (2014.11)

(56) References Cited

U.S. PATENT DOCUMENTS

2005/0228654 A1 10/2005 Prieto et al.
2006/0228034 A1* 10/2006 Mizuno .................. H04N 19/17 375/E7.182
2009/0092326 A1* 4/2009 Fukuhara ............. H04N 19/172 375/E7.076
2011/0134999 A1* 6/2011 Han ...................... H04N 19/63 375/240.18
2018/0176601 A1* 6/2018 Jeong .................. H04N 19/137

OTHER PUBLICATIONS

Uytterhoeven Geert et al: "Applying Integer Wavelet Transforms" In: "Wavelet analysis: a new tool in image and signal processing", Dec. 11, 1996 (Dec. 11, 1996), K.V.I.V, XP055954065, pp. 1-15.
Yang Chuxi et al: "Deep Image Compression in the Wavelet Transform Domain Based on High Frequency Sub-Band Prediction", IEEE Access, vol. 7, Apr. 30, 2019 (Apr. 30, 2019), pp. 52484-52497.

* cited by examiner 100
112
114
113
121
122
123
124
400
LEVEL 1
LEVEL 2
LEVEL 3
212
213
214
222
223
224
131
132
133
134
300

METHOD AND SYSTEM FOR PROCESSING AN IMAGE

BACKGROUND ART

Computer implemented methods for pre-processing an image are known from the state of the art. In a level 1 of such a method comprises the step of performing a 2D wavelet transform on the image, thereby decomposing the image in a low frequency subband comprising low frequency components in both a horizontal direction and a vertical direction, a first high frequency subband comprising high frequency components in the horizontal direction and low frequency components in the vertical direction, a second high frequency subband comprising low frequency components in the horizontal direction and high frequency components in the vertical direction, and a third high frequency subband comprising high frequency components in both the horizontal direction and the vertical direction. In the level 1, the method also comprises the step of storing the high frequency subbands of the level 1 as part of a pre-processed image. Optionally, in a level n, with n going from 2 up to a predetermined N, and with N being at least 2, the method comprises the step of performing a 2D wavelet transform on the low frequency subband of the level n−1, thereby decomposing the low frequency subband of the level n−1 in a low frequency subband, a first high frequency subband, a second high frequency subband and a third high frequency subband of the level n. In the level n, the method also comprises the step of storing the high frequency subbands of the level n as part of the pre-processed image. In the level N, the method also comprises the step of storing the low frequency subband of the level N as part of the pre-processed image. Thereby, the pre-processed image comprises the low frequency subband of the level N and the high frequency subbands of the levels 1 to N. The method also comprises the step of performing lossless compression on the pre-processed image. The method has the disadvantage that the data size of the compressed pre-processed image is still relatively large.

DISCLOSURE OF THE INVENTION

It is an aim of the present invention to provide a computer implemented method, a computing device, a computer program product and a computer-readable storage medium for pre-processing an image, preferably a video image, with improved lossless compression, resulting in a pre-processed image having a smaller data size.

This aim is achieved according to the present invention with a computer implemented method for pre-processing an image showing the technical characteristics of the first independent claim, a computer system showing the technical characteristics of the second independent claim, a computer program product showing the technical characteristics of the third independent claim, and a computer-readable storage medium showing the technical characteristics of the fourth independent claim.

Therefore, the present invention provides a computer implemented method for pre-processing an image. Preferably, the image is a video image. In a level 1 the method comprises the step of performing a predetermined transform, preferably a predetermined 2D transform, preferably a predetermined 2D transform in both a horizontal direction and a vertical direction for at least a part of the image, on the image, thereby decomposing the image in a low frequency subband and at least one, preferably at least two, preferably at most three, high frequency subband of the level 1. The low frequency subband comprises low frequency components in at least one of a horizontal direction and a vertical direction, preferably in both the horizontal direction and the vertical direction. The at least one high frequency subband comprises high frequency components in at least one of the horizontal direction and the vertical direction. In a level n, with n going from 2 up to a predetermined N, and with N being at least 2, the method comprises the step of performing the predetermined transform on the low frequency subband of the level n−1, thereby decomposing the low frequency subband of the level n−1 in a low frequency subband and at least one high frequency subband of the level n. In the level n, the method also comprises the step of resizing the at least one high frequency subband of the level n to the size, i.e. the dimensions, of the corresponding at least one high frequency subband of the level n−1. In the level n, the method also comprises the step of subtracting the resized at least one high frequency subband of the level n from the corresponding at least one high frequency subband of the level n−1 to obtain at least one subtracted subband of the level n−1. In the level n, the method also comprises the step of storing the at least one subtracted subband of the level n−1 as part of a pre-processed image, i.e. in a corresponding position of a pre-processed image having the same size, i.e. dimensions, as the image. In the level N, the method also comprises the step of storing the low frequency subband of the level N−1 as part of the pre-processed image. Thereby, the pre-processed image comprises the low frequency subband of the level N−1 and the at least one subtracted subband of the levels 1 to N−1.

Storing the at least one subtracted subband of the different levels in the pre-processed image instead of the corresponding at least one high frequency subband of the different levels offers the advantage that the at least one subtracted subband at the different levels comprise, in comparison to the corresponding at least one high frequency subband at the different levels, more pixel values of zero and a more narrow distribution of pixel values around zero due to the similarities between the corresponding at least one high frequency subband in subsequent levels, which makes the at least one subtracted subband more suitable for compression, either lossless or lossy, such that the pre-processed image can have a smaller data size.

In an embodiment of the method according to the present invention pixels in the at least one subtracted subband stored in the pre-processed image, which have a value within a predetermined range around zero, are set to zero.

This embodiment offers the advantage that the least significant values in the at least one subtracted subband of the different levels, i.e. the least significant differences between corresponding at least one high frequency subband of subsequent levels, are removed to be able to obtain an even better compression of the pre-processed image. This without much loss in quality of the image after being reconstructed from the pre-processed image, due the removal of only the least significant values in the pre-processed image.

In an embodiment of the method according to the present invention the method further comprises performing a predetermined compression on the pre-processed image.

The compression of the pre-processed image is beneficial to reduce the data size of the pre-processed image. The compression may be lossless compression or lossy compression.

In an embodiment of the method according to the present invention the predetermined compression is lossless compression.

Lossless compression is beneficial to maintain the quality of the image after it has been reconstructed from the pre-processed image.

In an embodiment of the method according to the present invention the method further comprises the step of converting the pre-processed image to a predetermined bit depth, preferably before the step of performing lossless compression on the pre-processed image. Preferably, the predetermined bit depth is the bit depth of the original image.

In this regard it is beneficial that the low frequency subband of the level N−1 is saved in the pre-processed image and not the corresponding low frequency subband and at least one high frequency subband of the level N, although they are just a different representation of the same data. When converting the pre-processed image to the predetermined bit depth, the converted low frequency subband of the level N−1 and all the converted subbands of the level N are however no longer the same. In this case it is beneficial to save the low frequency subband of the level N−1 in the pre-processed image, since no further processing has been performed on the low frequency subband of the level N−1 which might introduce undesired artefacts after the conversion of the pre-processed image to the predetermined bit depth.

In an embodiment of the method according to the present invention the predetermined transform is based on wavelets.

In an embodiment of the method according to the present invention the predetermined transform is based on Haar wavelets or Cohen-Daubechies-Feauveau (abbreviated as CDF) wavelets.

The inventors have found that a good reduction in the data size of the lossless compressed pre-processed image can be achieved when Haar wavelets or CDF wavelets are used for the predetermined transform in the method according to the present invention.

In an embodiment of the method according to the present invention the predetermined transform is a 2D wavelet transform. The 2D wavelet transform decomposes an input image in a low frequency subband, a first high frequency subband, a second high frequency subband and a third high frequency subband. The low frequency subband comprises low frequency components in both the horizontal direction and the vertical direction. The first high frequency subband comprises high frequency components in the horizontal direction and low frequency components in the vertical direction. The second high frequency subband comprises low frequency components in the horizontal direction and high frequency components in the vertical direction. The third high frequency subband comprises high frequency components in both the horizontal direction and the vertical direction.

In this embodiment the method will thus comprise the following steps. In a level 1 the method comprises the step of performing the predetermined transform, i.e. the 2D wavelet transform, on the image, thereby decomposing the image in a low frequency subband, a first high frequency subband, a second high frequency subband and a third high frequency subband of the level 1. The low frequency subband comprises low frequency components in both the horizontal direction and the vertical direction. The first high frequency subband comprises high frequency components in the horizontal direction and low frequency components in the vertical direction. The second high frequency subband comprises low frequency components in the horizontal direction and high frequency components in the vertical direction. The third high frequency subband comprises high frequency components in both the horizontal direction and the vertical direction. In a level n, with n going from 2 up to a predetermined N, and with N being at least 2, the method comprises the step of performing the 2D wavelet transform on the low frequency subband of the level n−1, thereby decomposing the low frequency subband of the level n−1 in a low frequency subband, a first high frequency subband, a second high frequency subband and a third high frequency subband of the level n. In the level n, the method also comprises the step of resizing the high frequency subbands of the level n to the size, i.e. the dimensions, of the high frequency subbands of the level n−1. In the level n, the method also comprises the step of subtracting the resized high frequency subbands of the level n from the corresponding high frequency subbands of the level n−1 to obtain subtracted subbands of the level n−1. In the level n, the method also comprises the step of storing the subtracted subbands of the level n−1 as part of a pre-processed image, i.e. in a corresponding position of a pre-processed image having the same size, i.e. dimensions, as the image. In the level N, the method also comprises the step of storing the low frequency subband of the level N−1 as part of the pre-processed image. Thereby, the pre-processed image comprises the low frequency subband of the level N−1 and the subtracted subbands of the levels 1 to N−1.

In an embodiment of the method according to the present invention the predetermined transform comprises a first 1D wavelet transform in a first direction selected from the horizontal direction and the vertical direction. The first 1D wavelet transform decomposes an input image in an intermediate low frequency subband and a first high frequency subband. The intermediate low frequency subband comprises low frequency components in the first direction. The first high frequency subband comprises high frequency components in the first direction. The predetermined transform further comprises a second 1D wavelet transform in a second direction selected from the horizontal direction and the vertical direction different from the first direction. The second 1D wavelet transform decomposes the intermediate low frequency subband in a low frequency subband and a second high frequency subband. The low frequency subband comprises low frequency components in both the first direction and the second direction. The second high frequency subband comprises low frequency components in the first direction and high frequency components in the second direction. As such, the predetermined transform of the input image will decompose the input image in the low frequency subband, the first high frequency subband and the second high frequency subband.

In this embodiment the method will thus comprise the following steps. In a level 1 the method comprises the step of performing the predetermined transform, on the image, thereby decomposing the image in a low frequency subband, a first high frequency subband and a second high frequency subband of the level 1. The low frequency subband comprises low frequency components in both the first direction and the second direction. The first high frequency subband comprises high frequency components in the first direction. The second high frequency subband comprises low frequency components in the first direction and high frequency components in the second direction. In a level n, with n going from 2 up to a predetermined N, and with N being at least 2, the method comprises the step of performing the predetermined transform on the low frequency subband of the level n−1, thereby decomposing the low frequency subband of the level n−1 in a low frequency subband, a first high frequency subband and a second high frequency subband of the level n. In the level n, the method also comprises the step of resizing the high frequency subbands of the level n to the size, i.e. the dimensions, of the high frequency subbands of the level n−1. In the level n, the method also comprises the step of subtracting the resized high frequency subbands of the level n from the corresponding high frequency subbands of the level n−1 to obtain subtracted subbands of the level n−1. In the level n, the method also comprises the step of storing the subtracted subbands of the level n−1 as part of a pre-processed image, i.e. in a corresponding position of a pre-processed image having the same size, i.e. dimensions, as the image. In the level N, the method also comprises the step of storing the low frequency subband of the level N−1 as part of the pre-processed image. Thereby, the pre-processed image comprises the low frequency subband of the level N−1 and the subtracted subbands of the levels 1 to N−1.

In an embodiment of the method according to the present invention the predetermined transform is a 1D wavelet transform in a first direction selected from the horizontal direction and the vertical direction. The 1D wavelet transform decomposes an input image in a low frequency subband and a high frequency subband. The low frequency subband comprises low frequency components in the first direction. The high frequency subband comprises high frequency components in the first direction.

In this embodiment the method will thus comprise the following steps. In a level 1 the method comprises the step of performing the predetermined transform, i.e. the 1D wavelet transform in the first direction, on the image, thereby decomposing the image in a low frequency subband and a high frequency subband of the level 1. The low frequency subband comprises low frequency components in the first direction. The high frequency subband comprises high frequency components in the first direction. In a level n, with n going from 2 up to a predetermined N, and with N being at least 2, the method comprises the step of performing the 1D wavelet transform in the first direction on the low frequency subband of the level n−1, thereby decomposing the low frequency subband of the level n−1 in a low frequency subband and a high frequency subband of the level n. In the level n, the method also comprises the step of resizing the high frequency subband of the level n to the size, i.e. the dimensions, of the high frequency subband of the level n−1. In the level n, the method also comprises the step of subtracting the resized high frequency subband of the level n from the high frequency subband of the level n−1 to obtain a subtracted subband of the level n−1. In the level n, the method also comprises the step of storing the subtracted subband of the level n−1 as part of a pre-processed image, i.e. in a corresponding position of a pre-processed image having the same size, i.e. dimensions, as the image. In the level N, the method also comprises the step of storing the low frequency subband of the level N−1 as part of the pre-processed image. Thereby, the pre-processed image comprises the low frequency subband of the level N−1 and the subtracted subband of the levels 1 to N−1.

In an embodiment of the method according to the present invention the steps of resizing and subtracting are performed on a pixel-by-pixel basis by subtracting from each pixel of the at least one high frequency subband of the level n−1 the corresponding pixel of the corresponding resized at least one high frequency subband of the level n. Said corresponding pixel is determined directly from the corresponding at least one high frequency subband of the level n, preferably by means of interpolation, and more preferably by means of nearest-neighbour interpolation.

This embodiment offers the advantage that the resized at least one high frequency subband of the level n does not have to be calculated completely to be stored in memory for use in the subtraction step, such that the memory usage is reduced. The use of the nearest neighbour interpolation offers the advantage that the corresponding pixels do not have to be calculated, since each pixel of the at least one high frequency subband of the level n is just used for being subtracted from multiple pixels of the at least one high frequency subband of the level n−1, such that processor usage and computing time is reduced.

The present invention further provides a method for post-processing a pre-processed image pre-processed with the method according to the present invention. After the pre-processing steps, the method further comprises post-processing steps. If the predetermined compression has been performed on the pre-processed image, the post-processing steps comprise performing a predetermined decompression corresponding to the predetermined compression on the pre-processed image. In the level N, the post-processing steps comprise storing the low frequency subband of the level N−1 stored in the pre-processed image as part of a post-processed image, i.e. in a corresponding position of a post-processed image having the same size, i.e. dimensions, as the pre-processed image. In the level N, the post-processing steps also comprise performing the predetermined transform on the low frequency subband of the level N−1 stored in the pre-processed image, thereby decomposing the low frequency subband of the level N−1 in a low frequency subband and at least one high frequency subband of the level N. In a level m, with m going from N to 2, the post-processing steps comprise resizing the at least one high frequency subband of the level m to the size, i.e. the dimensions, of the corresponding at least one subtracted subband of the level m−1 stored in the pre-processed image. In the level m, the post-processing steps also comprise adding the resized at least one high frequency subband of the level m to the corresponding at least one subtracted subband of the level m−1 to obtain the at least one high frequency subband of the level m−1. In the level m, the post-processing steps also comprise storing the at least one high frequency subband of the level m−1 as part of the post-processed image. In the level 1, the post-processing steps also comprise performing a predetermined inverse transform corresponding to the predetermined transform on the post-processed image to obtain the image.

In an embodiment of the method according to the present invention the steps of resizing and adding are performed on a pixel-by-pixel basis by adding to each pixel of the at least one subtracted subband of the level m−1 the corresponding pixel of the corresponding resized at least one high frequency subband of the level m. Said corresponding pixel is determined directly from the corresponding at least one high frequency subband of the level m, preferably by means of interpolation, and more preferably by means of nearest-neighbour interpolation.

This embodiment offers the advantage that the resized at least one high frequency subband of the level m does not have to be calculated completely to be stored in memory for use in the addition step, such that the memory usage is reduced. The use of the nearest neighbour interpolation offers the advantage that the corresponding pixels do not have to be calculated, since each pixel of the at least one high frequency subband of the level m is just used for being added to multiple pixels of the at least one subtracted subband of the level m−1, such that processor usage and computing time is reduced.

The present invention further provides a computing device comprising means to perform the method according to the present invention. The computing device may for example be a computer, a server, a mobile phone or a computer tablet. The means to perform the method may for example be a processor.

The present invention further provides a computer program product comprising instructions which, when the program is executed by a computing device, causes the computing device to perform the method according to the present invention.

The present invention further provides a computer-readable storage medium comprising instructions which, when the program is executed by a computing device, causes the computing device to perform the method according to the present invention.

BRIEF DESCRIPTION OF THE DRAWINGS

The invention will be further elucidated by means of the following description and the appended figures.

MODES FOR CARRYING OUT THE INVENTION

Figure 1:
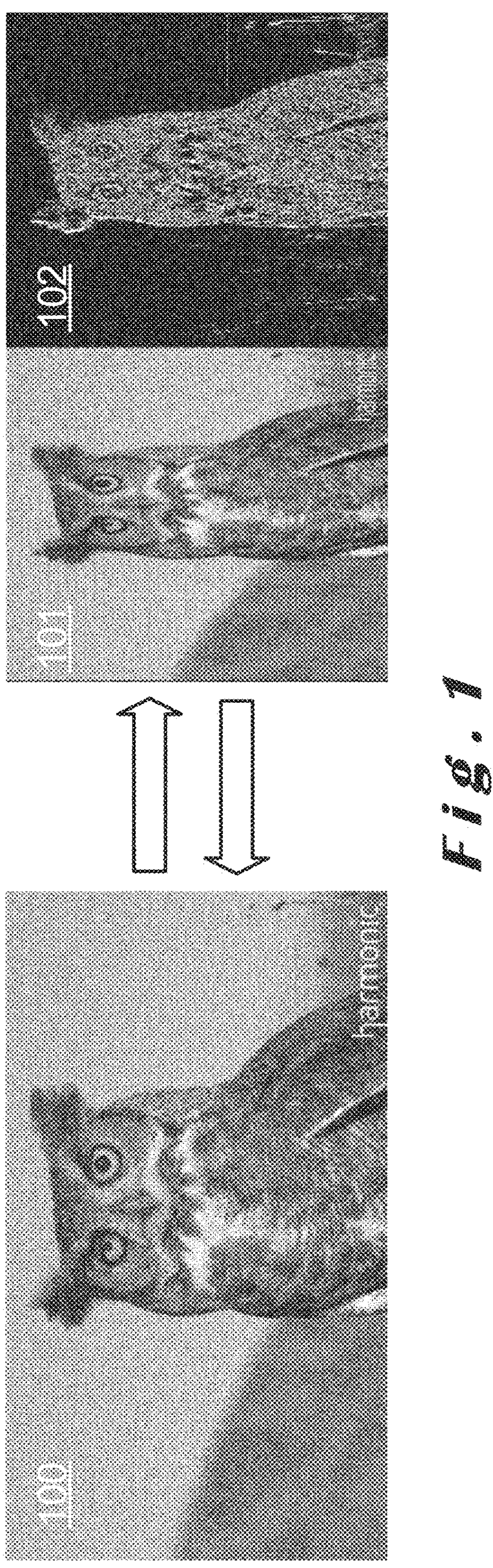
FIG. 1 shows a wavelet transform of an image in the horizontal direction.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The basic principle of a wavelet transform, such as for example a Haar wavelet transform or a Cohen-Daubechies-Feauveau, CDF, wavelet transform, is to mathematically decompose an image 100 into a low frequency subband 101 and a high frequency subband 102, as can be seen in FIG. 1. In the example of FIG. 1, the wavelet transform is applied on neighbouring pixels in each row of the image 100 individually from left to right in the horizontal direction. The result of the calculation is one low frequency subband 101 and one high frequency subband 102, wherein each subband 101, 102 is half the size of the original image 100. The inverse wavelet transform on the other hand reconstructs the image 100 into its original state using the low frequency subband 101 and the high frequency subband 102.

Using the Haar wavelet transform as an example, the formulas for calculating every pixel of the flow frequency subband 101 and the high frequency subband 102 are as follows: $LF=(A+B)/2$ and $HF=(B-A)/2$, with A and B representing neighbouring pixels of the original image 100 in the horizontal direction, and LF and HF respectively pixels of the low frequency subband 101 and the high frequency subband 102. For the inverse Haar wavelet transform, the formulas are as follows: $A=LF-HF$ and $B=LF+HF$.

Figure 2:
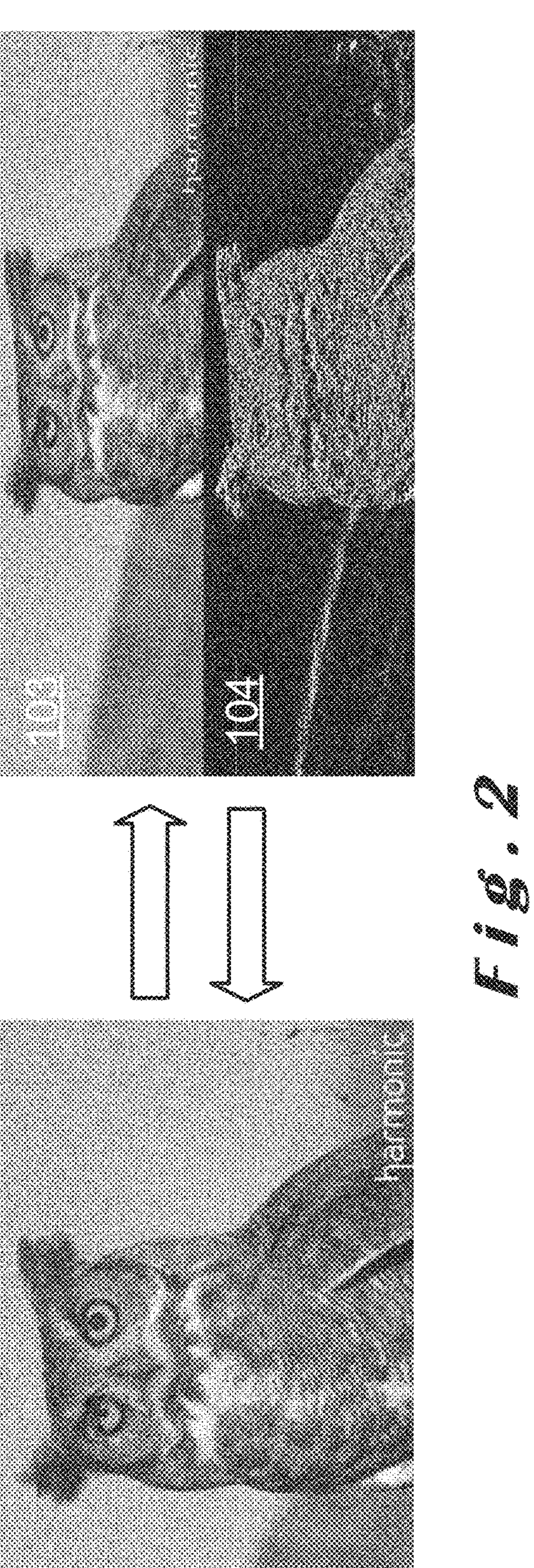
FIG. 2 shows a wavelet transform of an image in the vertical direction.

Similarly, the wavelet transform can also be applied in the vertical direction on neighbouring pixels in each column of the image 100 from top to bottom. Performing the wavelet transform in this way also gives one low frequency subband 103 and one high frequency subband 104 as a result, as can be seen in FIG. 2. Here, each subband 103, 104 is also half the size of the original image 100. In the example of the Haar wavelet transform, the same formulas can be used, but then applied in the vertical direction.

Figure 3:
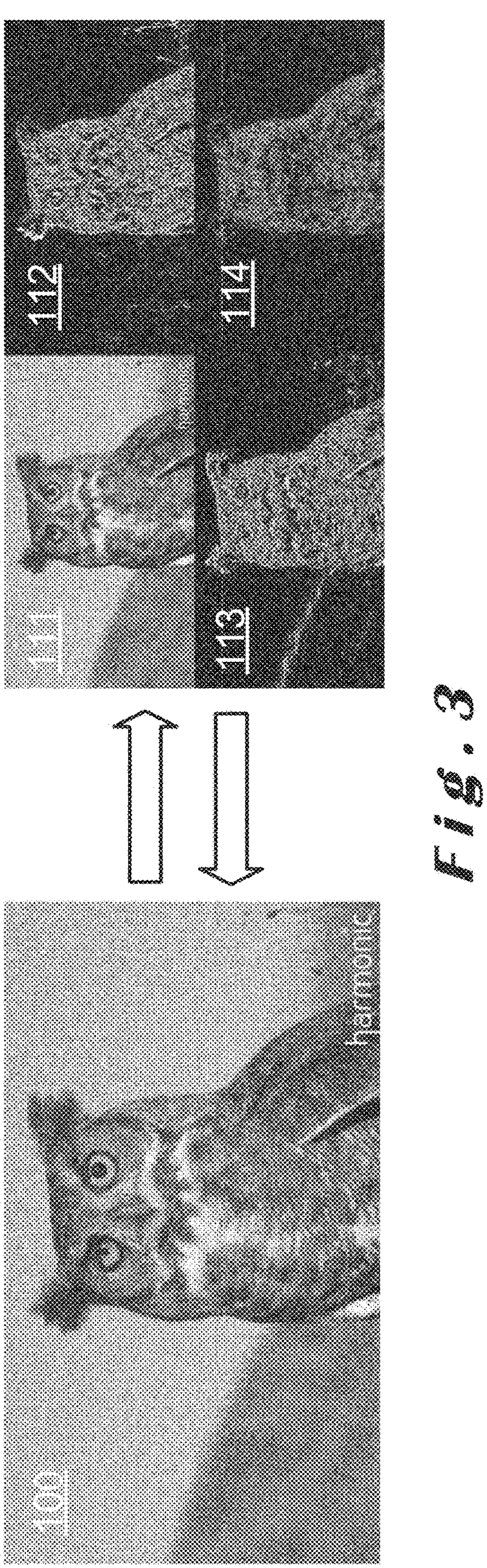
FIG. 3 shows 2D wavelet transform of an image.

The wavelet transform can be sequentially repeated as a 2D wavelet transform, meaning that the horizontal processing is followed by the vertical processing, or vice versa. This decomposes the image 100, as can be seen in FIG. 3, into a low frequency subband 111 comprising low frequency components in both the horizontal and vertical direction, a first high frequency subband 112 comprising high frequency components in the horizontal direction and low frequency components in the vertical direction, a second high frequency subband 113 comprising low frequency components in the horizontal direction and high frequency components in the vertical direction, and a third high frequency subband 114 comprising high frequency components in both the horizontal and vertical direction. Here, each subband 111, 112, 113, 114 is a quarter of the size of the original image 100.

Figure 4:
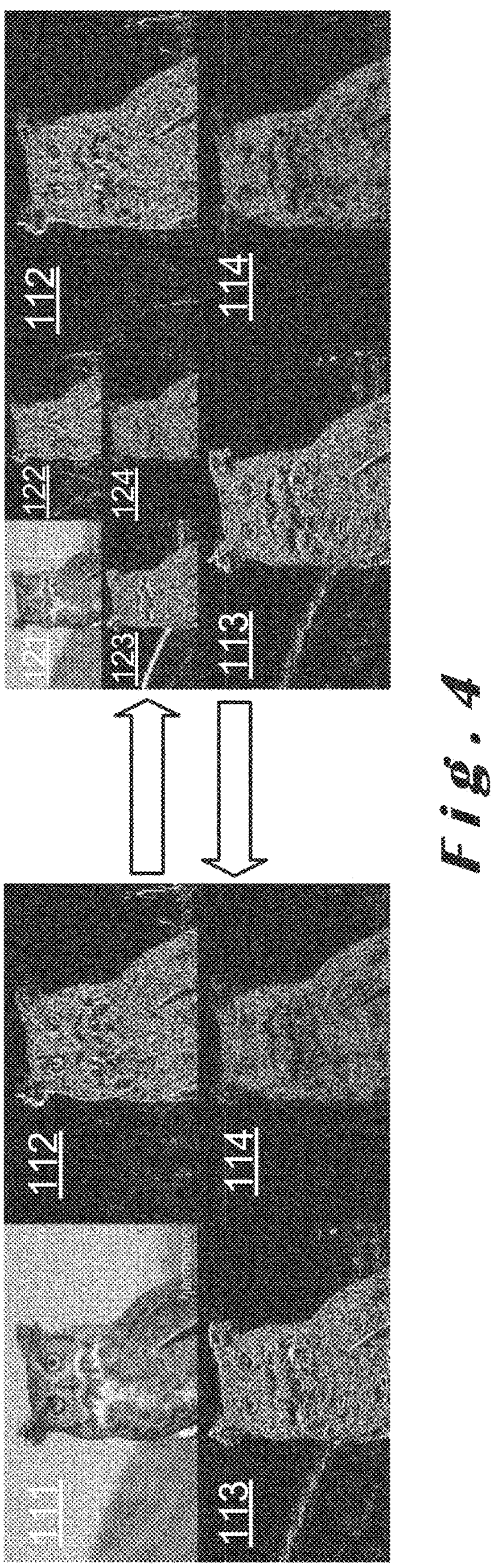
FIG. 4 shows two level 2D wavelet transform of an image.

The 2D wavelet transform can be applied in multiple levels, wherein the 2D wavelet transform as described above is considered level 1. For a level 2, the 2D wavelet transform is applied again onto the resulting low frequency subband 111 of the previous 2D wavelet transform, i.e. the one of level 1. In this way, as can be seen in FIG. 4, said low frequency subband 111 of level 1 is decomposed itself in a low frequency subband 121, a first high frequency subband 122, a second high frequency subband 123 and a third high frequency subband 124, but then of level 2. Using the inverse 2D wavelet transform, the level 1 decomposed image 111, 112, 113, 114 can be reconstructed from the decomposed image 121, 122, 123, 124, 112, 113, 114 of level 2, and then the original image 100 can be reconstructed from the reconstructed decomposed image 111, 112, 113, 114 of level 1.

Figure 5:
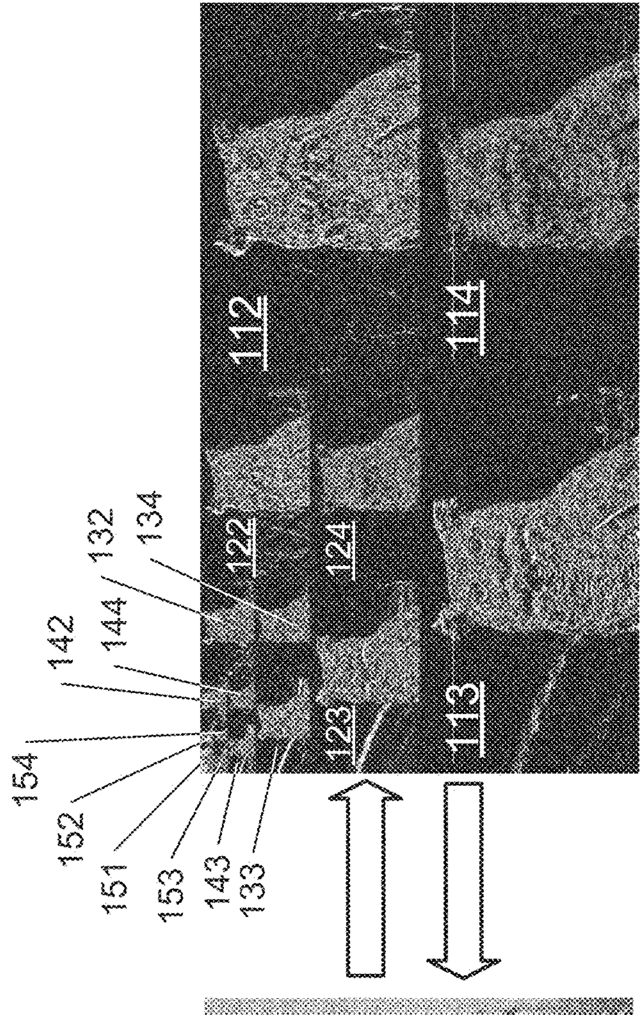
FIG. 5 shows five level 2D wavelet transform of an image.
Figure 5:
Figure 6:
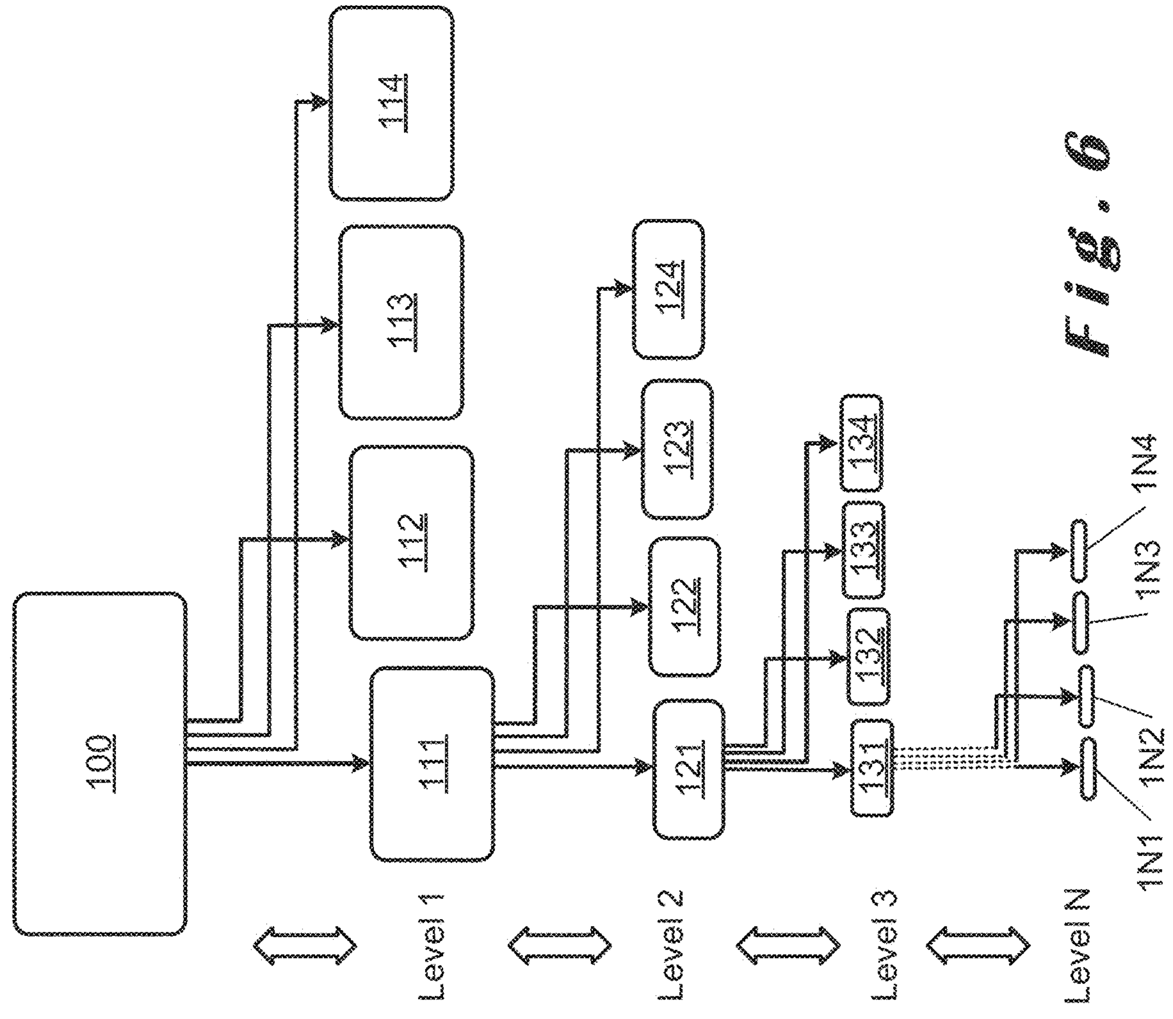
FIG. 6 shows a N level 2D wavelet transform of an image in a tree-like graph.

This process can be repeated for further levels, for as long as the resulting low frequency subband 111, 121, 131, 141, 151, . . . , 1N1 contains at least 2 pixels in both the horizontal direction and the vertical direction. FIG. 5 shows an example of 5 levels of a 2D wavelet transform, and the inverse transform that reconstructs the original image 100. To better visualise this multilevel processing FIG. 6 shows up to a level N the individual low frequency subband 111, 121, 131, . . . , 1N1, first high frequency subband 112, 122, 132, . . . , 1N2, second high frequency subband 113, 123, 133, . . . , 1N3 and third high frequency subband 114, 124, 134, . . . , 1N4 of each level in a tree-like graph. From this tree-like graph it is clear that each subsequent level is directly dependent on the previous level on either side. So, the algorithm needs to be processed at every level while traversing the tree in either one of the directions, i.e. up or down.

It is mathematically documented that this type of wavelet processing is 100% lossless for as long as all the first high frequency subbands 112, 122, 132, . . . , 1N2, the second high frequency subbands 113, 123, 133, . . . , 1N3 and the third high frequency subbands 114, 124, 134, . . . , 1N4 are preserved throughout all levels together with the low frequency subband 1N1 of the lowest level. There is no reduction in data size, since there is no data loss or data increase during the forward multilevel 2D wavelet transform or the inverse multilevel 2D wavelet transform, while keeping the first high frequency subbands 112, 122, 132, . . . , 1N2, the second high frequency subbands 113, 123, 133, . . . , 1N3 and the third high frequency subbands 114, 124, 134, . . . , 1N4 of each level together with the low frequency subband 1N1 of the lowest level.

Figure 7:
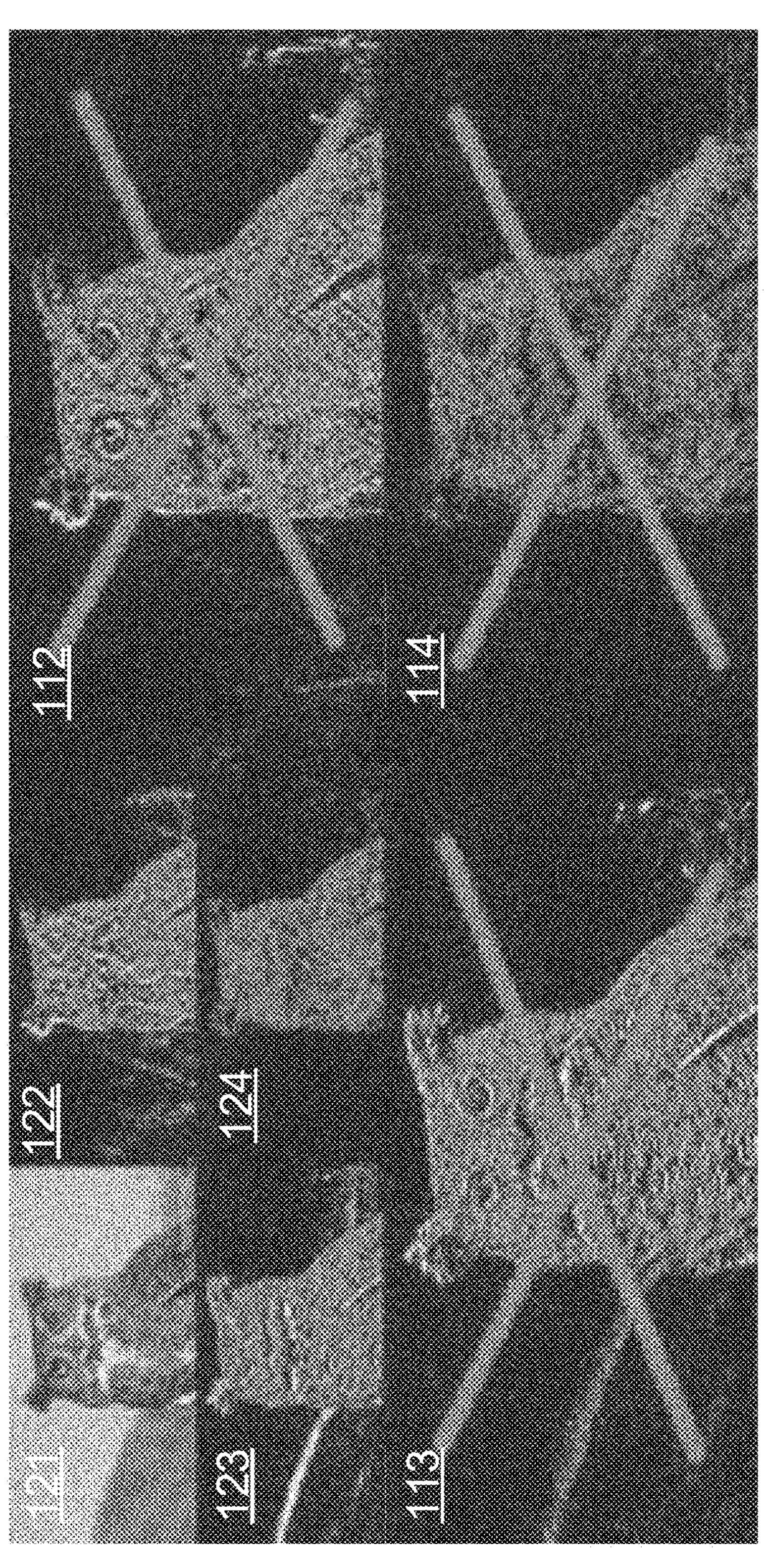
FIG. 7 illustrates a compression algorithm of an image known from the prior art.

One of the ways that the multi wavelet transform are used by today's image compression algorithms, is that the first high frequency subband 112, the second high frequency subband 113 and the third high frequency subband 114 of the parent level are discarded during the image encoding. They are then reconstructed back out of the low frequency subband 121, the first high frequency subband 122, the second high frequency subband 123, and the third high frequency subband 124 of the lower level during the image decoding. Various encoders use this technique in many different implementations. The basic idea of this approach is depicted in FIG. 7.

The major problem with this approach is, that it introduces artefacts. The data from the discarded high frequency subbands 112, 113, 114 of the parent level cannot be regenerated from the low frequency subband 121 and the high frequency subbands 122, 123, 124 of the lower level without loss in quality of the image 100. The main reason is that the high frequency subbands 112, 113, 114, 122, 123, 124 of the different levels are different from each other. They do not change that much with each level, but it is impossible to reconstruct the original image 100 without any loss this way, even for a simple two level 2D wavelet transform. The data loss is even more pronounced, if more than two levels of the 2D wavelet transform are applied on the original image 100. Some algorithms, for example using CDF wavelets, address this problem by smoothing based on interpolation. However, the result of any compression algorithm that discards high frequency subbands is lossy.

Figure 8:
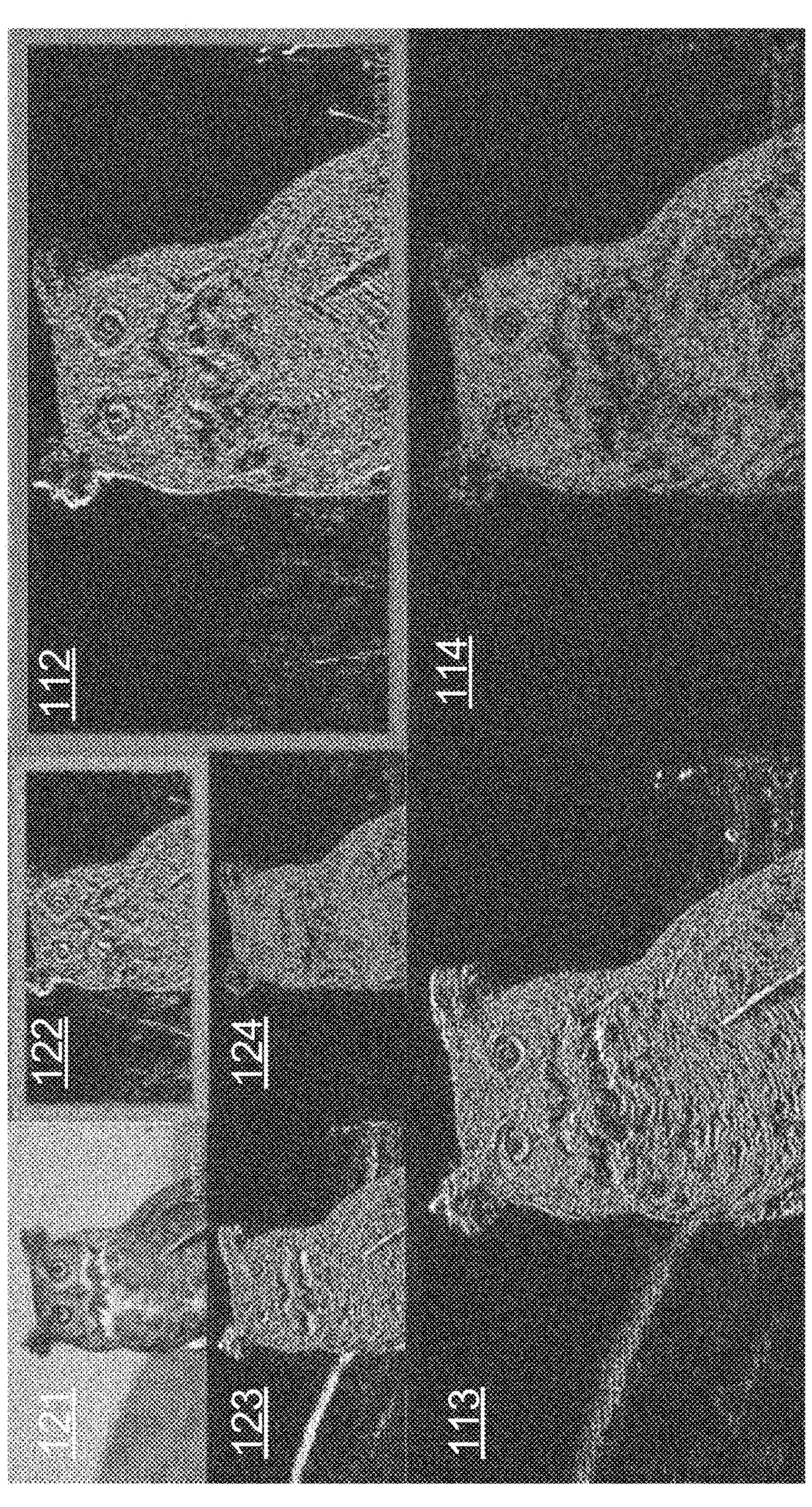
FIG. 8 shows a comparison of corresponding high frequency subbands in a two level 2D wavelet transform of an image.
Figure 9:
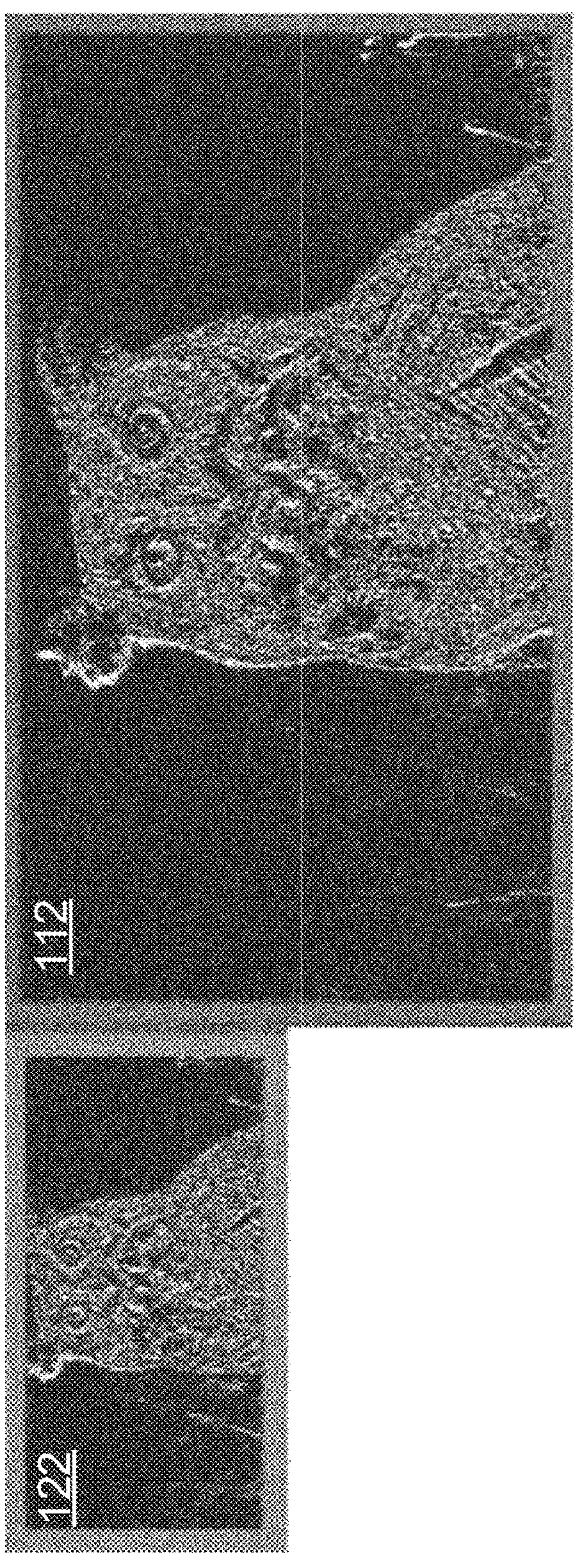
FIG. 9 shows in detail a comparison of two corresponding first high frequency subbands of level 1 and 2 of FIG. 8.

When zooming in on the two level 2D wavelet transform of FIG. 8, and comparing the first high frequency subband 112 of level 1 with the corresponding first high frequency subband 122 of level 2, as shown in detail in FIG. 9, the difference in the first high frequency subbands 112, 122 between the different levels can be clearly seen. The same applies for the second frequency subband 113 of level 1 and the corresponding second high frequency subband 123 the of level 2, and for the third frequency subband 114 of level 1 and the corresponding third high frequency subband 124 the of level 2, but for the discussion below there will be focused on the first high frequency subbands 112, 122, although it is also applicable to the second high frequency subbands 113, 123 and the third high frequency subbands 114, 124.

The processing algorithm of the method according to an embodiment of the present invention is based on the multilevel 2D wavelet transform, but goes a step further. It should be noted that the method according to alternative embodiments of the present invention may also be based on other transforms, of which examples will be given further below. As will be detailed further below, the method focuses on the actual data change of the high frequency subbands 112, 113, 114, 122, 123, 124 as the multilevel 2D wavelet transform traverses down the individual levels. Thereby, it detects this change, analyses, and optionally filters this detected change, and then records it for each individual data element, i.e. pixel, individually at the different levels of the multilevel 2D wavelet transform. During the inverse wavelet transform, the method of this embodiment then uses this detected change to reconstruct at each level the high frequency subbands 112, 113, 114, 122, 123, 124 of the parent level, and finally the original image 100 in a lossless way. This technique can be applied to any type of existing wavelet transform, such as for example the Haar or the CDF wavelet transform.

When looking at the corresponding first high frequency subbands 112, 122 in FIG. 8, it can be seen that first these corresponding first high frequency subbands 112, 122 have to be brought to the same size, in order to compare individual pixels between them. The first high frequency subband 112 of level 1 could be resized by any suitable method to match the size of the first high frequency subband 122 of level 2, for example by omitting every other column and every other row from the first high frequency subband 112 of level 1, but this approach would result in information loss.

The better approach is to resize the first high frequency subband 122 of level 2 to match the size of the first high frequency subband 112 of level 1 by any suitable method, for example by replicating every other column and every other row, i.e. by means of nearest neighbour interpolation, or by generating intermediate rows and columns with other interpolation techniques. All existing types of the 2D wavelet transform, such as the Haar wavelet transform or the CDF wavelet transform, produce the high frequency subbands 112, 113, 114, 122, 123, 124 and also the low frequency subband 111, 121 at the lower level in both the horizontal and vertical dimension exactly half the size of the higher level component, i.e. the low frequency subband 111 at the higher level or the original image 100, such that resizing the high frequency subbands 122, 123, 124 at the lower level to match the size of the corresponding high frequency subbands 112, 113, 114 at the higher level is a pretty straightforward process.

Figure 10:
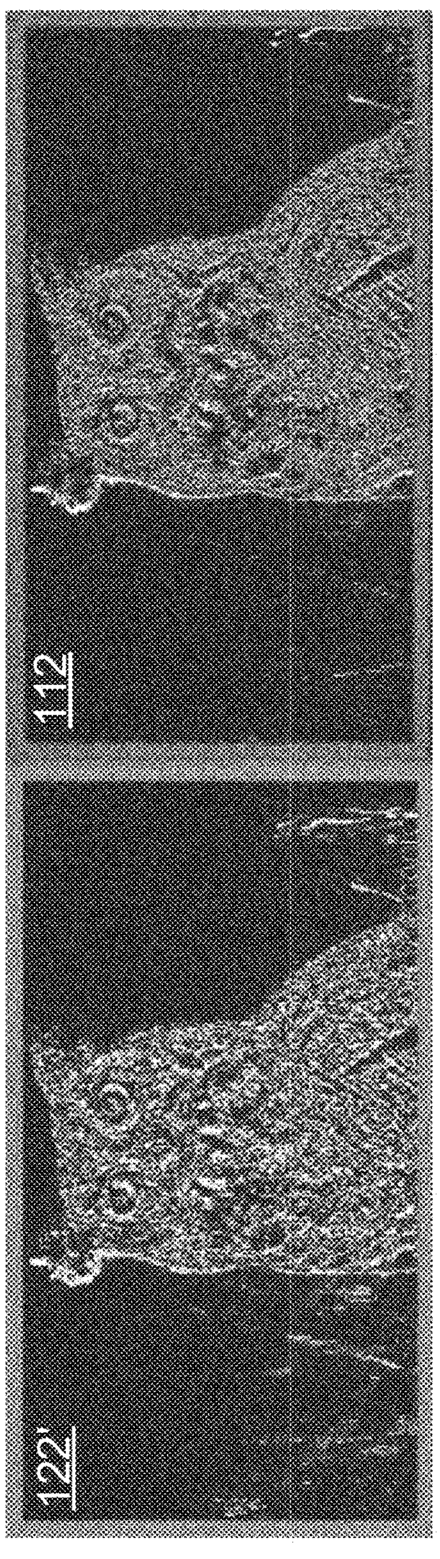
FIG. 10 shows a resized first high frequency subband of level 2 besides a corresponding first high frequency subband of level 1.

FIG. 10 shows the resized first high frequency subband 122' of level 2 besides the first high frequency subband 112 of level 1. The amount of change between these subbands 122', 112 can be detected by simply taking on a pixel-by-pixel basis the difference between these subbands 122', 112 according to the formula SUB=HF1−HF2, wherein HF1 is the first high frequency subband 112 of level 1 and HF2 is the resized first high frequency subband 122' of level 2. Note that the resulting value for each pixel can be either positive or negative, or even zero, since the resized first high frequency subband 122' of level 2 and the first high frequency subband 112 of level 1 are remarkably similar.

Figure 11:
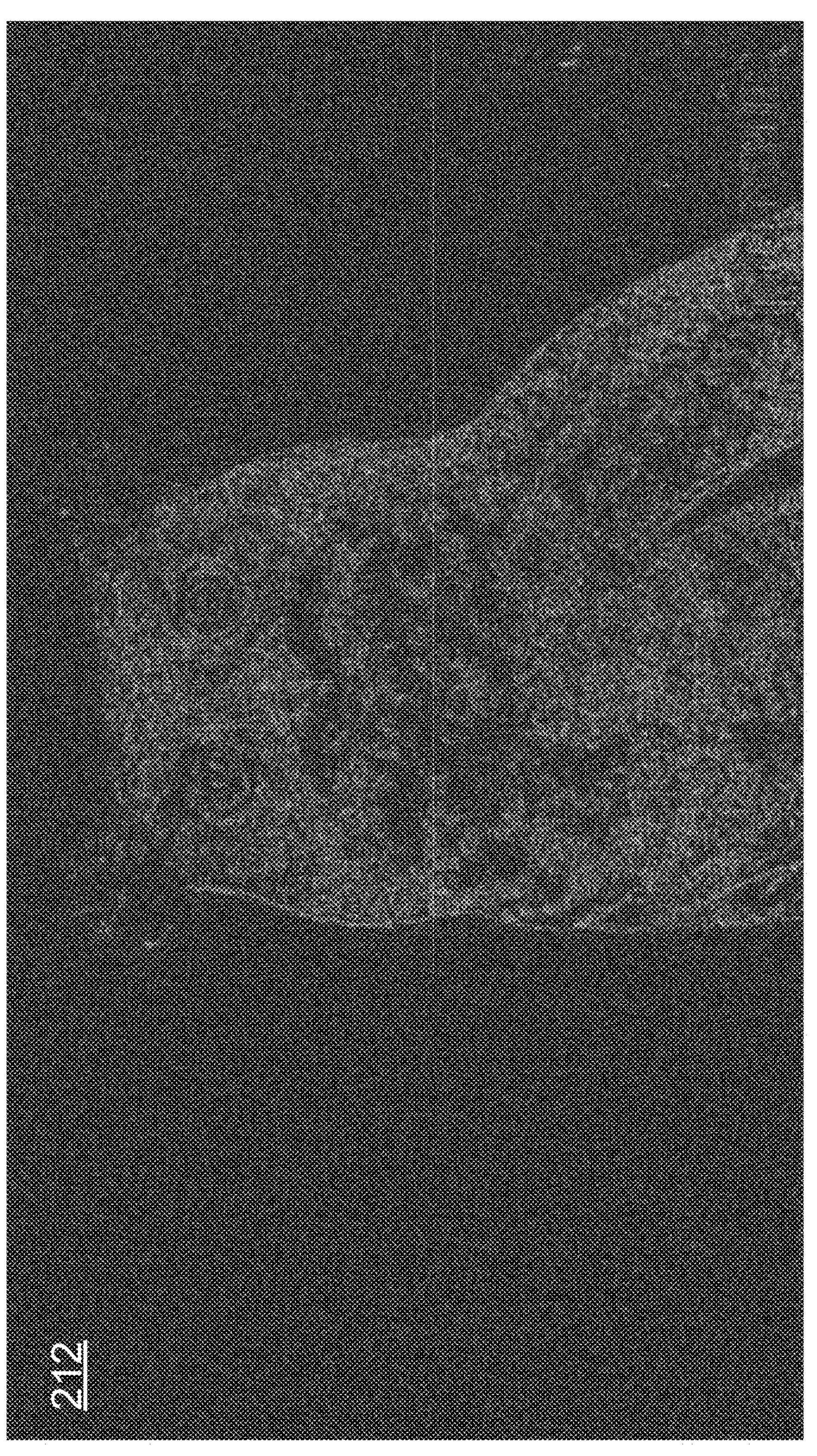
FIG. 11 shows a subtracted subband of level 1 calculated from the first high frequency subbands shown in FIG. 10.

FIG. 11 shows the subtracted subband 212 of the level 1, i.e. the result of the subtraction between the first high frequency subband 112 of level 1 and the resized high frequency subband 122' of level 2. As can be seen the resulting image 212 has a low intensity. This is a result of having many values from the subtraction that are zero or close to zero, hence there is a narrow distribution of values around zero. The reason for that is that the high frequency subbands 112, 122 are changing very little between subsequent levels, thus the values that are entered into the subtraction formula are either the same or almost the same. The second reason is that the high frequency subbands 112, 122, since being high frequency, contain by definition the differences with respect to the original image pixel values. For example, the high frequency subbands 112, 113, 114 for a Haar wavelet transform are calculated as (B−A)/2, from among the two neighbouring pixels A and B of the original image 100. This value is already reduced by a factor of two or more to begin with, and many times even much more. These could also be zero in many cases where the neighbouring pixels have the same value, and this not only for the same value in the horizontal direction, but also for two neighbouring pixels in the vertical direction as well.

Figure 12:
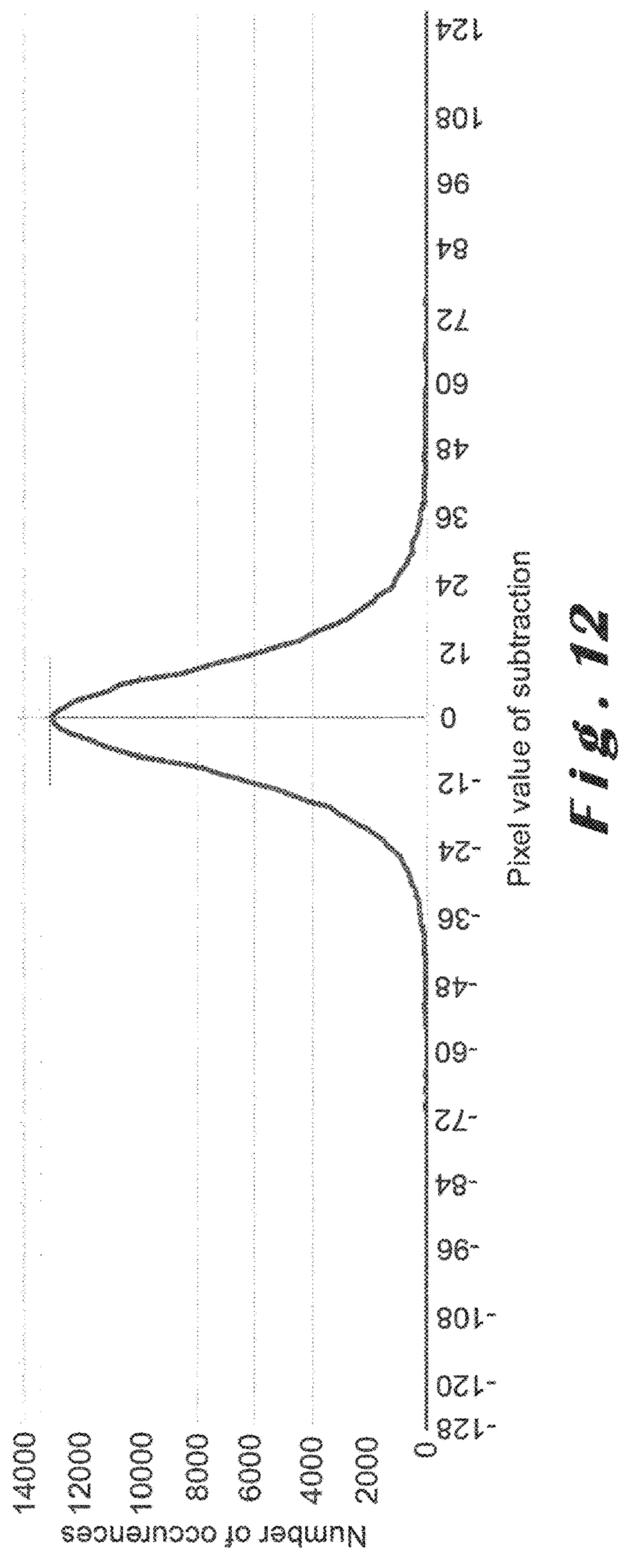
FIG. 12 shows the distribution of the pixel values of a subtracted subband.

FIG. 12 shows graphically how narrow the subtracted data range is. It is centred around the zero value. There are a large number of zeros in the subtracted subband 212 of the level 1, which all indicate that there is no change in the corresponding pixel values of the first high frequency subband 112 of the level 1 and the resized first high frequency subband 122' of the level 2. All these zero values are simply not needed for lossless processing, because if a pixel of the first high frequency subband 112 of the level 1 contains the same value as a corresponding pixel of the resized first frequency subband 122' of the level 2, that pixel can be reconstructed lossless in the inverse wavelet transform process based on the resized first high frequency subband 122' of the level 2 and the subtracted subband 212 of the level 1.

Figure 13:
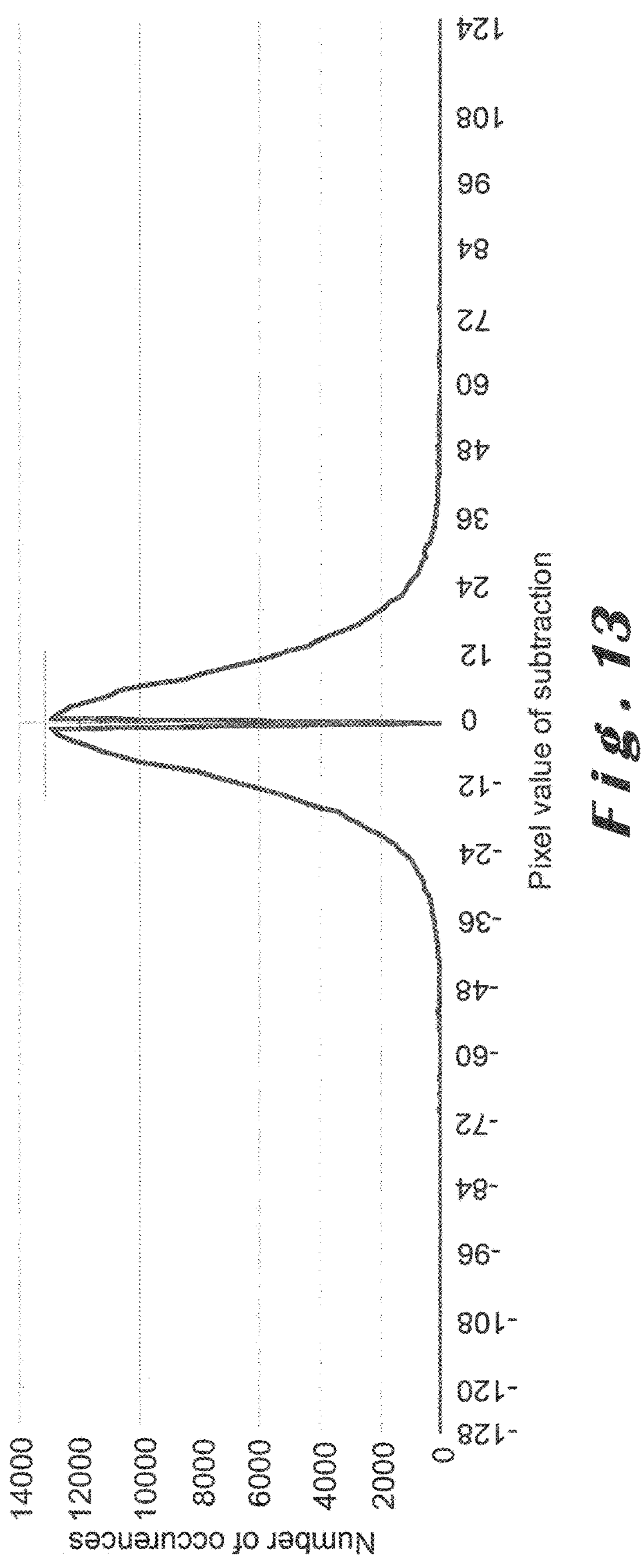
FIG. 13 shows the distribution of the pixel values of a subtracted subband with the zero values filtered out.

FIG. 13 shows the same graph as FIG. 12, but with all the zero values omitted. The reconstruction using the subtracted subband 212 of the level 1 with the zero values removed, is still lossless, since the zero values indicate that the corresponding pixels of the first high frequency subband 112 of level 1 and the resized first high frequency subband 122' of the level 2 are the same.

The further away the values are from the zero value of the centre, they indicate more change in between the pixel values of the first high frequency subband 112 of level 1 and the resized first high frequency subband 122' of level 2. It can also be seen that the occurrence of values away from the centre declines significantly. The values that are the furthest away from the centre, account for the most change in between the pixel values of the first high frequency subband 112 of level 1 and the resized first high frequency subband 122' of level 2, and so their preservation is the most significant for achieving lossless reconstruction.

In cases where the data size of the subtracted subband 112 of level 1 needs to be reduced even further, a filtering technique can be applied, resulting in quasi lossless processing. This technique is based on discarding a part of the data of the subtracted subband 212 that has the least impact on the quality of the reconstruction of the original image 100. This is the second biggest benefit of this subtraction-based algorithm, in a sense that it orders the values based on the significance impact on the quality of processing. A significance filter can easily balance the size versus quality processing, as it can easily filter out the least significant data, i.e. the data closest to the centre.

Figure 14:
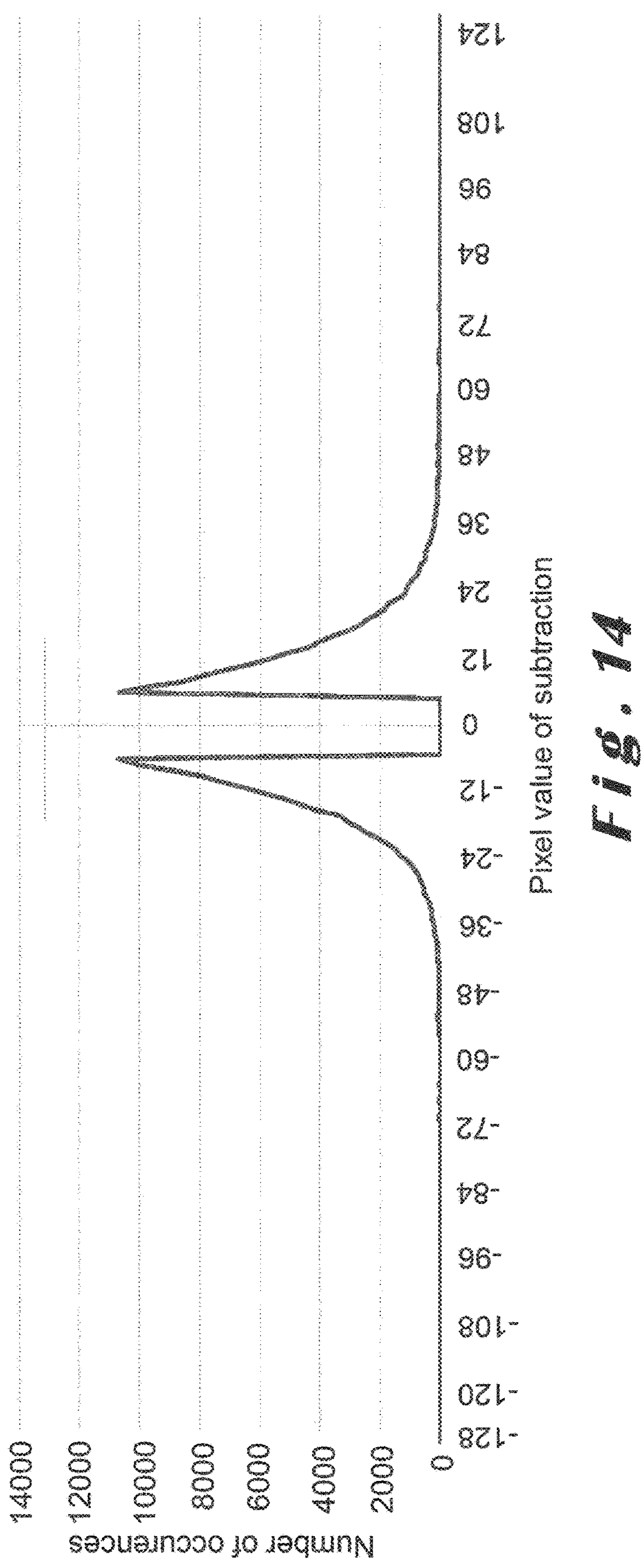
FIG. 14 shows the distribution of the pixel values of a subtracted subband with the values in a range [−5, 5] filtered out.

FIG. 14 shows a case where all the values of the subtracted subband 212 of level 1 in a range of [−5, 5] is set to zero. From the graph it can be estimated that almost half of the total of the subtraction data is saved, while the impact on the quality is minimal. By testing it was found that a significance filter setting of 5 gives the best trade-off between the quality loss and the data size, since the quality loss is almost non-detectable.

Figure 15:
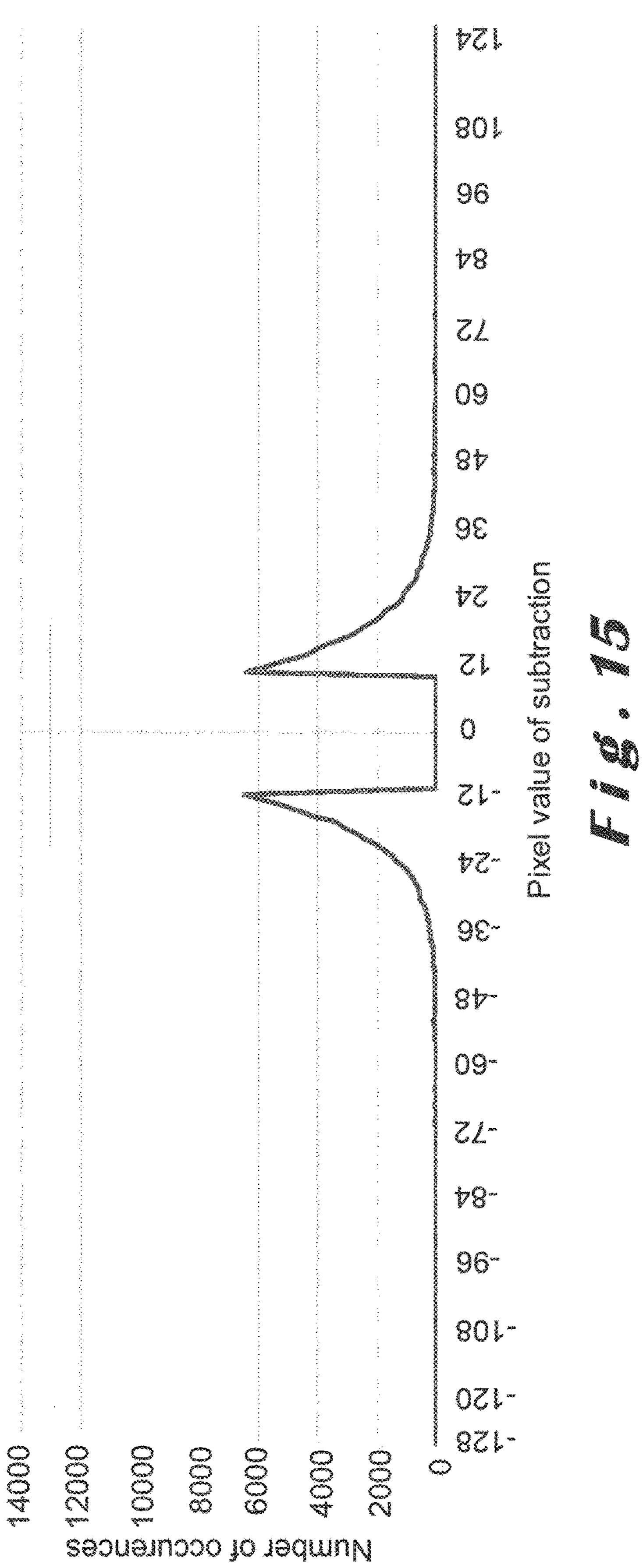
FIG. 15 shows the distribution of the pixel values of a subtracted subband with the values in a range [−10, 10] filtered out.

The value of the significance filter can be increased, for example in a range [−10, 10], as can be seen in FIG. 15. The resulting quality might still be acceptable. What is preserved here is a fraction of the total data size of the subtracted subband 212 of the level 1. This fraction has however the biggest impact on preserving the quality. The values from 10 and up to about 40 indicate that the resized first frequency subband 122' of the level 2 has changed significantly in comparison to the first high frequency subband 112 of the level 1, thus the correction is needed the most for these values. All the less important changes were filtered out, and so the data size of the subtracted subband 212 was reduced significantly in this case.

Figure 16:
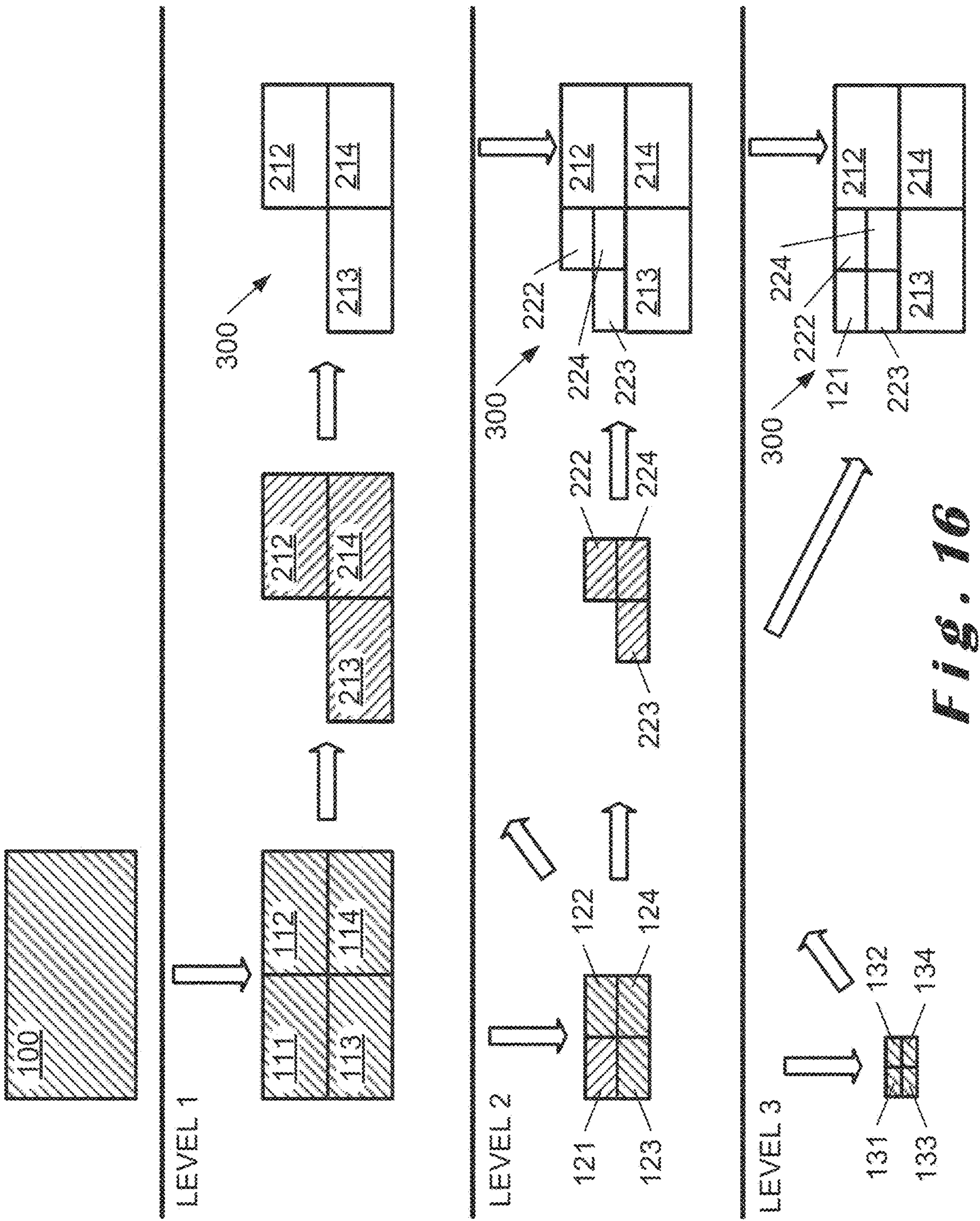
FIG. 16 shows a schematic representation of a method according to an embodiment of the present invention for pre-processing an image.

To visualise how and where the method of the present invention is applied to enhance wavelet processing to achieve lossless quality, the multilevel wavelet processing is drawn in a tree-like graph. FIG. 16 shows three levels of the 2D wavelet transform applied on the original image 100.

The subtracted subbands 212, 213, 214, 222, 223, 224 created by the method according to the present invention at each level replace the corresponding high frequency subbands 112, 113, 114, 122, 123, 124 at each level, which is beneficial because the subtracted subbands 212, 213, 214, 222, 223, 224 have a smaller data size when finally the pre-processed image 300 is compressed lossless. The low frequency subbands 111, 131, the first high frequency subbands 112, 122, 132, the second high frequency subbands 113, 123, 133 and the third high frequency subbands 114, 124, 134 can then be safely discarded at each intermediate level. The high frequency subbands 132, 133, 134 at the last level are only used for calculating the corresponding subtracted subbands 222, 223, 224 at the second to last level, and do not need to be preserved. Only the low frequency subband 121 of the second to last level is preserved.

FIG. 16 shows two group of objects. One that can be safely removed and another that needs to be preserved. The first group, indicated by the forwards line shading, shows the high frequency subbands 112, 113, 114, 122, 123, 124, 132, 133, 134 and low frequency subbands 111, 131 of all levels that can be safely removed. The method according to the present invention requires the presence of the high frequency subbands 132, 133, 134 at the last level N, which is 3 in this example. However, rather than preserving the high frequency subbands 132, 133, 134 and the low frequency subband 131 of the last level N, only the low frequency subband 121 of the second to last level N−1 is preserved. The creation of the low frequency subband 131 and the high frequency subbands 132, 133, 134 at the last level N is only temporary for the purpose of generating the different subtracted subbands 222, 223, 224 at the previous level N−1. Afterwards, the low frequency subband 131 and the high frequency subbands 132, 133, 134 at the last level N are deleted. This approach reduces a quality loss caused by the conversion of the pre-processed image 300 to a predetermined bit depth, because the low frequency subband 121 is preserved in the higher resolution of level N−1. Only the subtracted subbands 212, 213, 214, 222, 223, 224 at all levels, and the low frequency subband 121 at the second to last level N−1 need to be preserved as shown in the second group, indicated by the backwards line shading.

In summary, the pre-processing of an image 100 by means of the embodiment of the method according to the present invention, as shown in FIG. 16, is performed as follows.

In level 1, a 2D wavelet transform is performed on the image 100, thereby decomposing the image 100 in a low frequency subband 111, a first high frequency subband 112, a second high frequency subband 113 and a third high frequency subband 114 of the level 1.

In level 2, a 2D wavelet transform is performed on the low frequency subband 111 of the level 1, thereby decomposing the low frequency subband 111 of the level 1 in a low frequency subband 121, a first high frequency subband 122, a second high frequency subband 123 and a third high frequency subband 124 of the level 2. Then, each of the high frequency subbands 122, 123, 124 of the level 2 is resized to the size of the corresponding high frequency subband 112, 113, 114 of the level 1. In a next step, each resized high frequency subband (not shown) of the level 2 is subtracted from the corresponding high frequency subband 112, 113, 114 of the level 1 to obtain the corresponding subtracted subbands 212, 213, 214 of the level 1, which are stored as a part of the pre-processed image 300.

In level 3, a 2D wavelet transform is performed on the low frequency subband 121 of the level 2, thereby decomposing the low frequency subband 121 of the level 2 in a low frequency subband 131, a first high frequency subband 132, a second high frequency subband 133 and a third high frequency subband 134 of the level 3. Then, each of the high frequency subbands 132, 133, 134 of the level 3 is resized to the size of the corresponding high frequency subband 122, 123, 124 of the level 2. In a next step, each resized high frequency subband (not shown) of the level 3 is subtracted from the corresponding high frequency subband 122, 123, 124 of the level 2 to obtain the corresponding subtracted subbands 222, 223, 224 of the level 2, which are stored together with the low frequency subband 121 of the level 2 as a part of the pre-processed image 300.

In a further step, preferably lossless compression is performed on the pre-processed image 300.

The more levels N are at play, the more data size saving is achieved, without compromising the lossless quality of the method according to the present invention.

Furthermore, in combination with any encoder using lossy compression, the resulting saving of large data of an uncompressed image, is further multiplied by the compression factor of the encoder, resulting in further data saving.

Since the amount of the data change in between any high frequency subband 112, 113, 114, 122, 123, 124 at a higher level, referred to as HF1, and a corresponding resized high frequency subband at a lower level, referred to as HF2, is preserved in the corresponding subtracted subband using the formula SUB=HF1−HF2, the high frequency subbands 112, 113, 114, 122, 123, 124 at the higher level, which were previously discarded, can easily be recovered using the reverse formula HF1=HF2+SUB.

Figure 17:
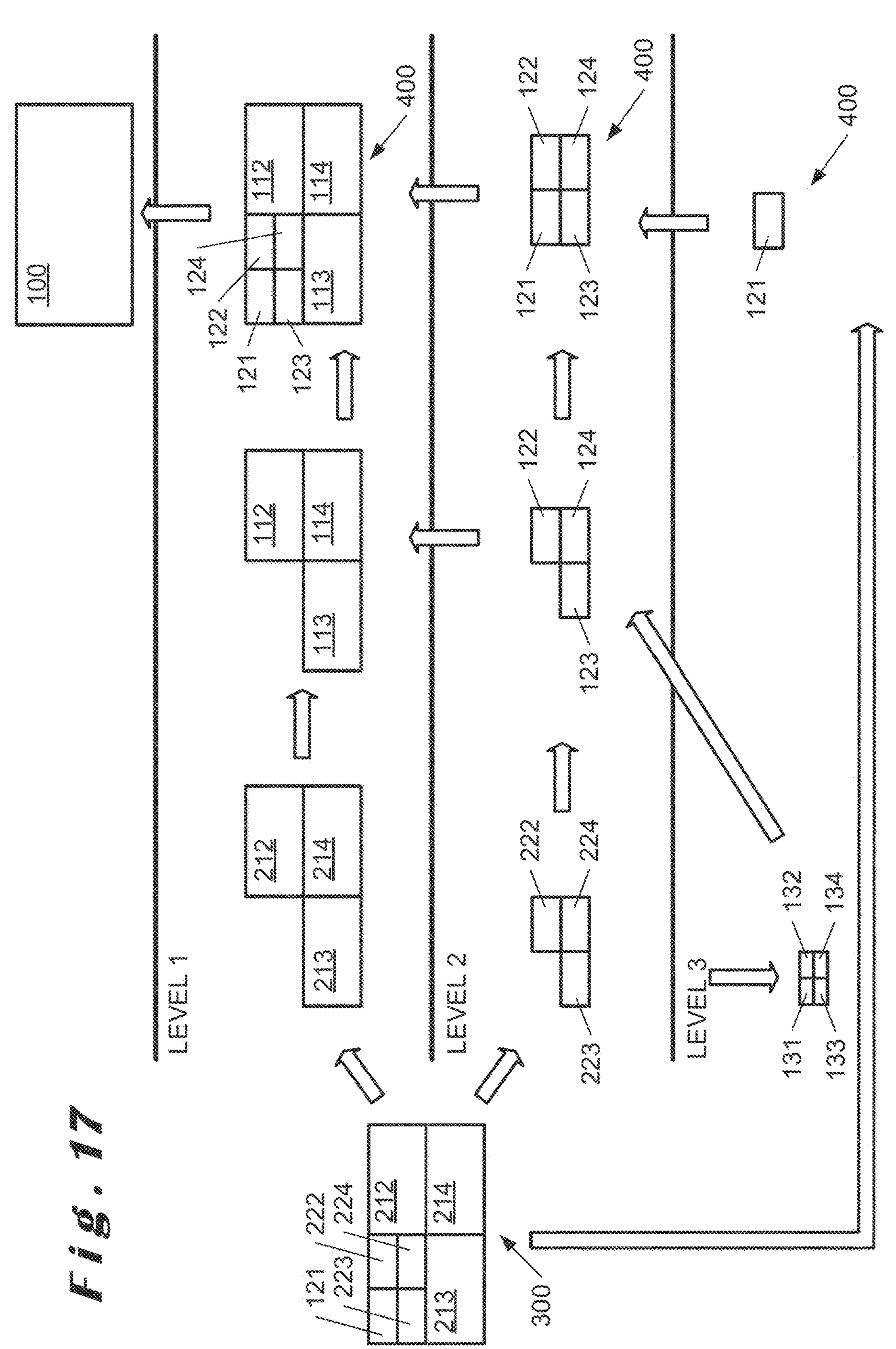
FIG. 17 shows a schematic representation of a method according to an embodiment of the present invention for post-processing a pre-processed image.

As such, by reversing the flow of FIG. 16 and applying the reconstruction method as described, the wavelet tree can be traversed and the original image 100 regenerated lossless as shown in FIG. 17.

In summary, the post-processing of the pre-processed image 300 by means of the embodiment of the method according to the present invention, as shown in FIG. 17, is performed as follows.

First, the pre-processed image 300 is decompressed to undo the lossless compression of the pre-processed image 300.

In level 3, the low frequency subband 121 of the level 2 from the pre-processed image 300 is stored as part of a post-processed image 400. Then, a 2D wavelet transform is performed on the low frequency subband 121 of the level 2 from the pre-processed image 300, thereby decomposing the low frequency subband 121 of the level 2 in a low frequency subband 131, a first high frequency subband 132, a second high frequency subband 133 and a third high frequency subband 134 of the level 3. Then, each of the high frequency subbands 132, 133, 134 of the level 3 is resized to the size of the corresponding subtracted subbands 222, 223, 224 of the level 2 from the pre-processed image 300. In a next step, each resized high frequency subband (not shown) of the level 3 is added to the corresponding subtracted subband 222, 223, 224 of the level 2 from the pre-processed image 300 to obtain the corresponding high frequency subbands 122, 123, 124 of the level 2, which are stored as a part of the post-processed image 400.

In level 2, each of the high frequency subbands 122, 123, 124 of the level 2 is resized to the size of the corresponding subtracted subbands 212, 213, 214 of the level 1 from the pre-processed image 300. In a next step, each resized high frequency subband (not shown) of the level 2 is added to the corresponding subtracted subband 212, 213, 214 of the level 1 from the pre-processed image 300 to obtain the corresponding high frequency subbands 112, 113, 114 of the level 1, which are stored as a part of the post-processed image 400.

In level 1, a 2D inverse wavelet transform is performed on the post-processed image 400 to obtain back the original image 100.

The method according to the embodiment of the present invention discussed above is based on the 2D wavelet transform, but as already indicated before, the method may in alternative embodiments of the present invention also be based on other transforms.

An example of such an alternative transform is a 1D wavelet transform in the horizontal direction as shown in FIG. 1, or a 1D wavelet transform in the vertical direction as shown in FIG. 2.

Figure 18:
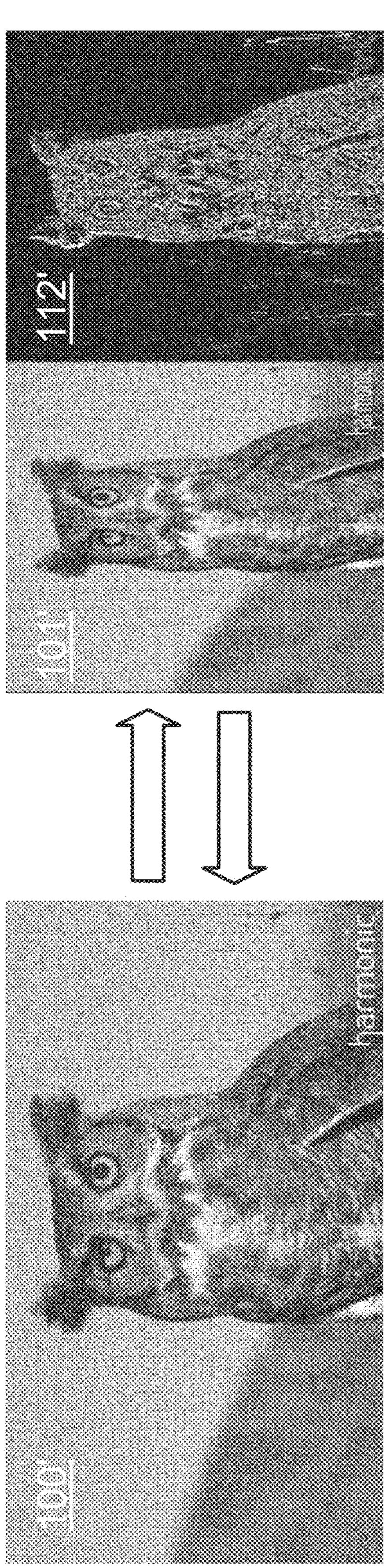
FIG. 18 shows a predetermined transform of an input image according to an embodiment of the present invention.
Figure 18:
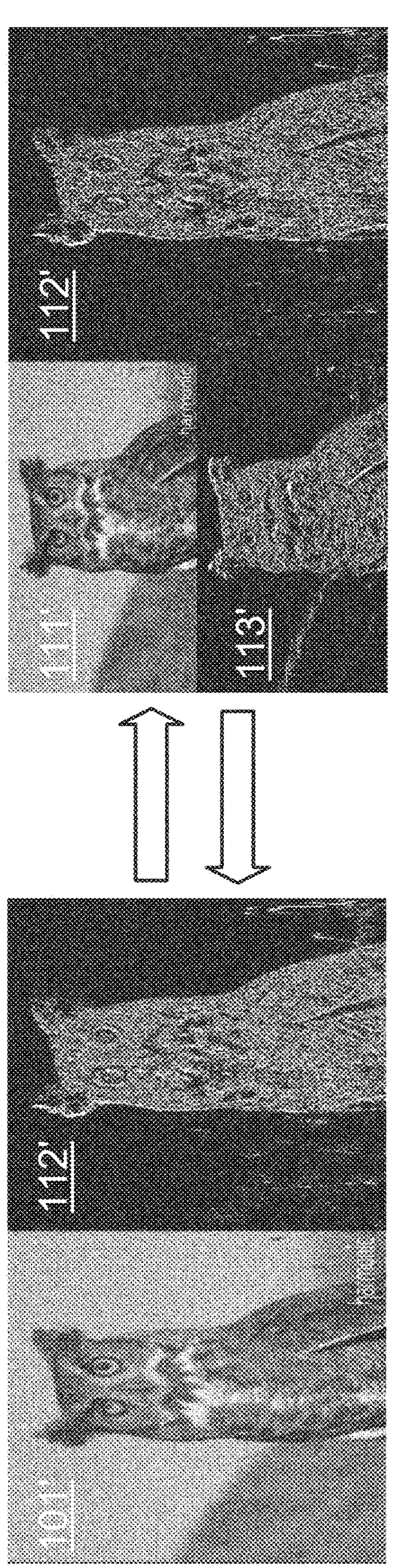

Another example of such an alternative transform, illustrated in FIG. 18, comprises a first 1D wavelet transform in the horizontal direction. The first 1D wavelet transform decomposes an input image 100' in an intermediate low frequency subband 101' and a first high frequency subband 112'. The intermediate low frequency subband 101' comprises low frequency components in the horizontal direction. The first high frequency subband 112' comprises high frequency components in the horizontal direction. The transform further comprises a second 1D wavelet transform in the vertical direction that decomposes the intermediate low frequency subband 101' in a low frequency subband 111' and a second high frequency subband 113', while leaving the first high frequency subband 112' untouched. The low frequency subband 111' comprises low frequency components in both the horizontal direction and the vertical direction. The second high frequency subband 113' comprises low frequency components in the horizontal direction and high frequency components in the vertical direction. As such, this transform of the input image 100' decomposes the input image 100' in the low frequency subband 111', the first high frequency subband 112' and the second high frequency subband 113'. The inverse transform of this transform comprises a first 1D inverse transform in the vertical direction on the low frequency subband 111' and the second high frequency subband 113' in the final image, resulting back in the intermediate image comprising the intermediate low frequency subband 101' and the first high frequency subband 112'. The inverse transform of this transform further comprises a second 1D inverse transform in the horizontal direction on the intermediate image comprising the intermediate low frequency subband 101' and the first high frequency subband 112', resulting back in the input image 100'.

Figure 19:
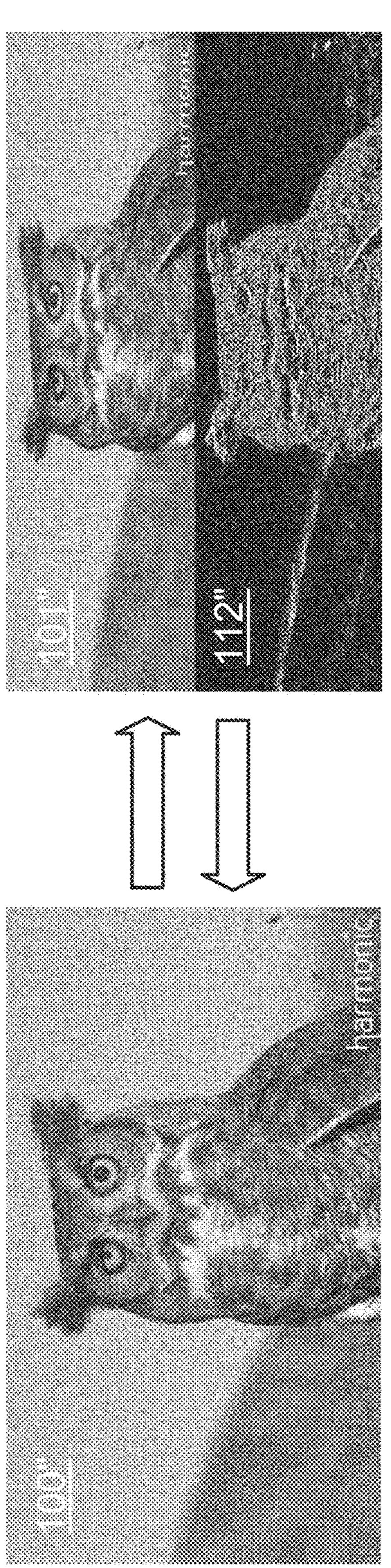
FIG. 19 shows a predetermined transform of an input image according to an embodiment of the present invention.
Figure 19:
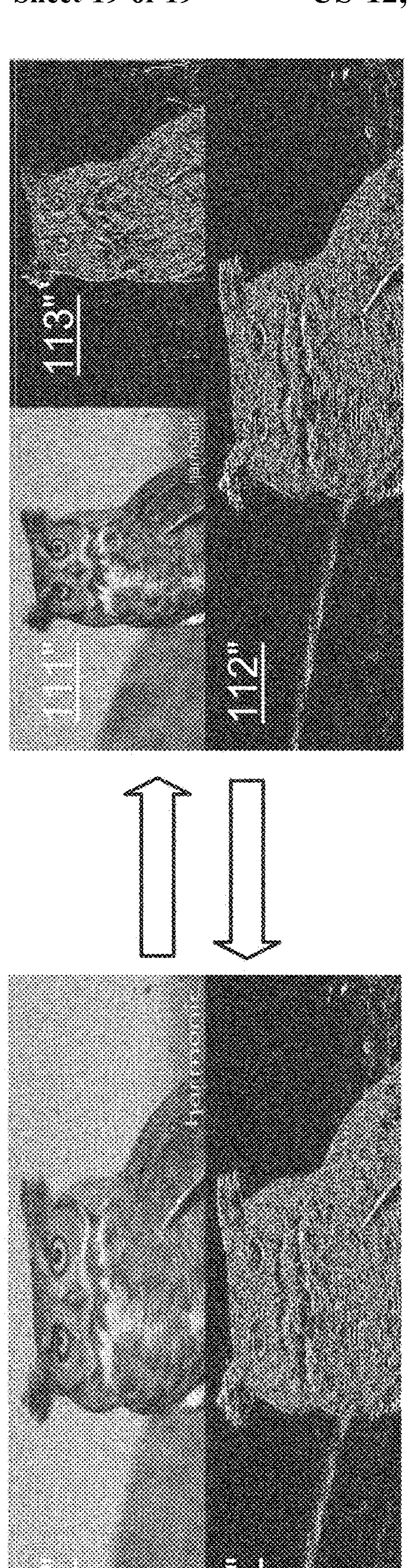

Another example of such an alternative transform, illustrated in FIG. 19, comprises a first 1D wavelet transform in the vertical direction. The first 1D wavelet transform decomposes an input image 100" in an intermediate low frequency subband 101" and a first high frequency subband 112". The intermediate low frequency subband 101" comprises low frequency components in the vertical direction. The first high frequency subband 112" comprises high frequency components in the vertical direction. The transform further comprises a second 1D wavelet transform in the horizontal direction that decomposes the intermediate low frequency subband 101" in a low frequency subband 111" and a second high frequency subband 113", while leaving the first high frequency subband 112" untouched. The low frequency subband 111" comprises low frequency components in both the horizontal direction and the vertical direction. The second high frequency subband 113" comprises low frequency components in the vertical direction and high frequency components in the horizontal direction. As such, this transform of the input image 100" decomposes the input image 100" in the low frequency subband 111", the first high frequency subband 112" and the second high frequency subband 113". The inverse transform of this transform comprises a first 1D inverse transform in the horizontal direction on the low frequency subband 111" and the second high frequency subband 113" in the final image, resulting back in the intermediate image comprising the intermediate low frequency subband 101" and the first high frequency subband 112". The inverse transform of this transform further comprises a second 1D inverse transform in the vertical direction on the intermediate image comprising the intermediate low frequency subband 101" and the first high frequency subband 112", resulting back in the input image 100".

The invention claimed is:

1. A computer implemented method for pre-processing an image, wherein the image has a predetermined bit depth, the method comprising the steps of:

in a level 1:

performing a predetermined transform on the image, thereby decomposing the image in:

a low frequency subband of the level 1 comprising low frequency components in both a horizontal direction and a vertical direction;

at least one high frequency subband of the level 1 comprising high frequency components in at least one of the horizontal direction and the vertical direction;

in a level n, with n going from 2 up to a predetermined N, and with N being at least 2:

performing the predetermined transform on the low frequency subband of the level n−1, thereby decomposing the low frequency subband of the level n−1 in a low frequency subband and at least one high frequency subband of the level n;

resizing each high frequency subband of the level n to the dimensions of the corresponding high frequency subband of the level n−1, such that each resized high frequency subband of the level n has an equal amount of pixels in a width direction and a height direction as the corresponding high frequency subband of the level n−1;

subtracting each resized high frequency subband of the level n from the corresponding high frequency subband of the level n−1 to obtain at least onea corresponding subtracted subband of the level n−1;

storing each corresponding subtracted subband of the level n−1 as part of a pre-processed image; and in the level N:

storing the low frequency subband of the level N−1 as part of the pre-processed image, and wherein the method further comprises the step of converting the preprocessed image to the predetermined bit depth.

2. The method according to claim 1, wherein pixels in each subtracted subband stored in the preprocessed image, which have a value within a predetermined range around zero, are set to zero.

3. The method according to claim 1, wherein the method further comprises performing a predetermined compression on the pre-processed image.

4. The method according to claim 3, wherein the predetermined compression is lossless compression.

5. The method according to claim 1, wherein the predetermined transform is based on wavelets.

6. The method according to claim 1, wherein the predetermined transform is based on Haar wavelets or Cohen-Daubechies-Feauveau wavelets.

7. The method according to claim 1, wherein the predetermined transform is a 2D wavelet transform decomposing an input image in:

a low frequency subband comprising low frequency components in both the horizontal direction and the vertical direction;

a first high frequency subband comprising high frequency components in the horizontal direction and low frequency components in the vertical direction;

a second high frequency subband comprising low frequency components in the horizontal direction and high frequency components in the vertical direction, and a third high frequency subband comprising high frequency components in both the horizontal direction and the vertical direction.

8. The method according to claim 1, wherein the predetermined transform comprises:

a first 1D wavelet transform in a first direction selected from the horizontal direction and the vertical direction, decomposing an input image in:

an intermediate low frequency subband comprising low frequency components in the first direction; and a first high frequency subband comprising high frequency components in the first direction;

a second 1D wavelet transform in a second direction selected from the horizontal direction and the vertical direction different from the first direction, decomposing the intermediate low frequency subband in: a low frequency subband comprising low frequency components in both the first direction and the second direction; and a second high frequency subband comprising low frequency components in the first direction and high frequency components in the second direction.

9. The method according to claim 1, wherein the steps of resizing and subtracting are performed on a pixel-by-pixel basis by subtracting from each pixel of each high frequency subband of the level n-1 the corresponding pixel of the corresponding resized each high frequency subband of the level n, wherein said corresponding pixel is determined directly from the corresponding high frequency subband of the level n by means of interpolation.

10. A method for post-processing a pre-processed image pre-processed with the method according to claim 1, wherein the method further comprises, after the pre-processing steps, the post-processing steps of:

in case the predetermined compression has been performed on the pre-processed image, performing a predetermined decompression corresponding to the predetermined compression on the pre-processed image; in all cases:

in the level N:

storing the low frequency subband of the level N−1 stored in the pre-processed image as part of a post-processed image; and performing the predetermined transform on the low frequency subband of the level N−1 stored in the pre-processed image, thereby decomposing the low frequency subband of the level N−1 in a low frequency subband and at least one high frequency subband of the level N;

in a level m, with m going from N to 2:

resizing each high frequency subband of the level m to the dimensions of the corresponding subtracted subband of the level m−1 stored in the pre-processed image, such that each resized high frequency subband of the level m has an equal amount of pixels in a width direction and a height direction as the corresponding subtracted subband of the level m−1;

adding each resized high frequency subband of the level m to the corresponding at least one-subtracted subband of the level m−1 to obtain the corresponding high frequency subband of the level m−1; and storing each high frequency subband of the level m−1 as part of the post-processed image;

in the level 1:

performing a predetermined inverse transform corresponding to the predetermined transform on the post-processed image to obtain the image.

11. The method according to claim 10, wherein the steps of resizing and adding are performed on a pixel-by-pixel basis by adding to each pixel of each subtracted subband of the level m-1 the corresponding pixel of the corresponding resized high frequency subband of the level m, wherein said corresponding pixel is determined directly from the corresponding high frequency subband of the level m by means of interpolation.

12. A computing device comprising means to perform the method according to claim 1.

13. A non-transitory computer-readable storage medium comprising instructions which, when executed by a computing device, causes the computing device to perform the method according to claim 1.

* * * * *